(12) United States Patent
Kawamura et al.

(10) Patent No.: US 8,595,233 B2
(45) Date of Patent: Nov. 26, 2013

(54) DATA PROCESSING APPARATUS, DATA PROCESSING METHOD, PROGRAM, AND INTEGRATED CIRCUIT

(75) Inventors: Takashi Kawamura, Kyoto (JP); Kuniaki Isogai, Osaka (JP); Yazhou Liu, Nanjing (CN)

(73) Assignee: Panasonic Corporation, Osaka (JP)

( * ) Notice: Subject to any disclaimer, the term of this patent is extended or adjusted under 35 U.S.C. 154(b) by 238 days.

(21) Appl. No.: 13/000,083

(22) PCT Filed: Apr. 23, 2010

(86) PCT No.: PCT/JP2010/002946
§ 371 (c)(1),
(2), (4) Date: Jan. 13, 2011

(87) PCT Pub. No.: WO2010/125781
PCT Pub. Date: Nov. 4, 2010

(65) Prior Publication Data
US 2011/0106772 A1 May 5, 2011

(30) Foreign Application Priority Data
Apr. 27, 2009 (JP) ................................. 2009-108500

(51) Int. Cl.
*G06F 17/30* (2006.01)
(52) U.S. Cl.
USPC ........................................................ 707/737
(58) Field of Classification Search
USPC .................. 707/687, 773, 738, 739, 740, 737
See application file for complete search history.

(56) References Cited

U.S. PATENT DOCUMENTS

| 7,274,822 B2 | 9/2007 | Zhang et al. |
| 7,403,642 B2 | 7/2008 | Zhang et al. |
| 7,747,624 B2 * | 6/2010 | Campos et al. ............... 707/737 |

(Continued)

FOREIGN PATENT DOCUMENTS

| CN | 1432908 | 7/2003 |
| JP | 2000-067065 | 3/2000 |

(Continued)

OTHER PUBLICATIONS

International Search Report issued Jun. 8, 2010 in International (PCT) Application No. PCT/JP2010/002946.

(Continued)

*Primary Examiner* — Greta Robinson
(74) *Attorney, Agent, or Firm* — Wenderoth, Lind & Ponack, L.L.P.

(57) ABSTRACT

A data processing apparatus includes: a temporary storage unit storing a cluster-element correspondence table showing correspondence between a cluster ID for identifying each of clusters classified by the data processing apparatus and an element ID of element data belonging to the cluster identified by the cluster ID, and a group-cluster correspondence table showing correspondence between a group ID for identifying a group classified according to a user's subjective criterion and a cluster ID of a cluster belonging to the group identified by the group ID; a feature extraction unit extracting a feature value of newly added element data; and an automatic classification processing unit determining a belonging cluster from the clusters, and updating a classification boundary condition defining a boundary of the belonging cluster. The apparatus also includes a data management unit recording an element ID of the newly added element data and a cluster ID of the belonging cluster.

20 Claims, 34 Drawing Sheets

(56) References Cited

U.S. PATENT DOCUMENTS

| | | | |
|---|---|---|---|
| 7,971,150 B2 * | 6/2011 | Raskutti et al. | 715/764 |
| 2004/0076329 A1 | 4/2004 | Skarbek et al. | |
| 2005/0038769 A1 | 2/2005 | Aggarwal et al. | |
| 2007/0226209 A1 | 9/2007 | Aggarwal et al. | |
| 2008/0089561 A1 | 4/2008 | Zhang | |
| 2008/0175485 A1 | 7/2008 | Kato | |

FOREIGN PATENT DOCUMENTS

| | | |
|---|---|---|
| JP | 2000-353165 | 12/2000 |
| JP | 2004-054957 | 2/2004 |
| JP | 2005-100363 | 4/2005 |
| JP | 2005-275556 | 10/2005 |
| JP | 2006-244279 | 9/2006 |
| JP | 2007-102362 | 4/2007 |
| JP | 2007-172046 | 7/2007 |
| JP | 2008-005335 | 1/2008 |
| JP | 2008-052560 | 3/2008 |
| JP | 2009-252069 | 10/2009 |
| WO | 2008/045521 | 4/2008 |

OTHER PUBLICATIONS

Cui et al. "EasyAlbum: An Interactive Photo Annotation System Based on Face Clustering and Re-ranking" *CHI 2007 Proceedings Photo Sharing*, Apr. 28-May 3, 2007, San Jose, CA USA, pp. 367-376.

Tian et al. "A Face Annotation Framework with Partial Clustering and Interactive Labeling" *IEEE*, 2007.

Kurita et al. "A Sequential Algorithm for Pattern Classification by Mahalanobis Distance", *Electrotechnical Laboratory*, 1992 (with English translation).

Wang et al., "Study of Ontology-based Document Classification System" (Department of Computer Science & Engineering, Shanghai Jiaotong University, Shanghai 200030, China) Computer Simulation, vol. 22, No. 4, pp. 183-186, Apr. 2005 (including English translation of abstract and partial English translation of p. 186).

* cited by examiner

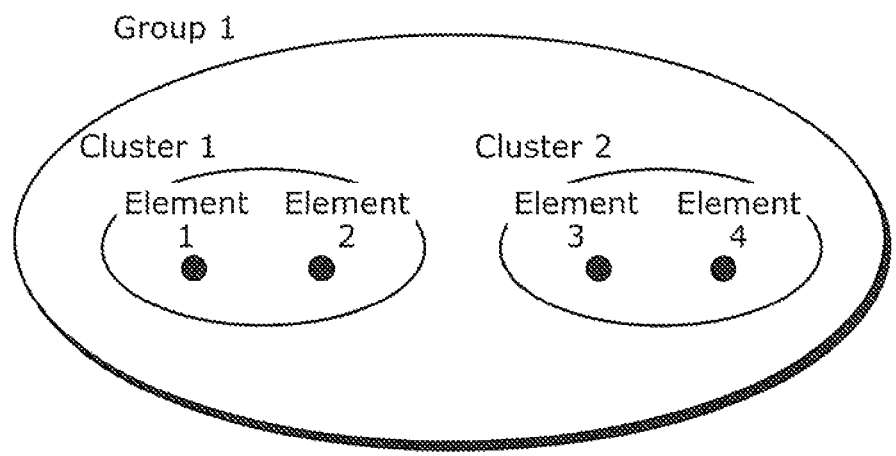

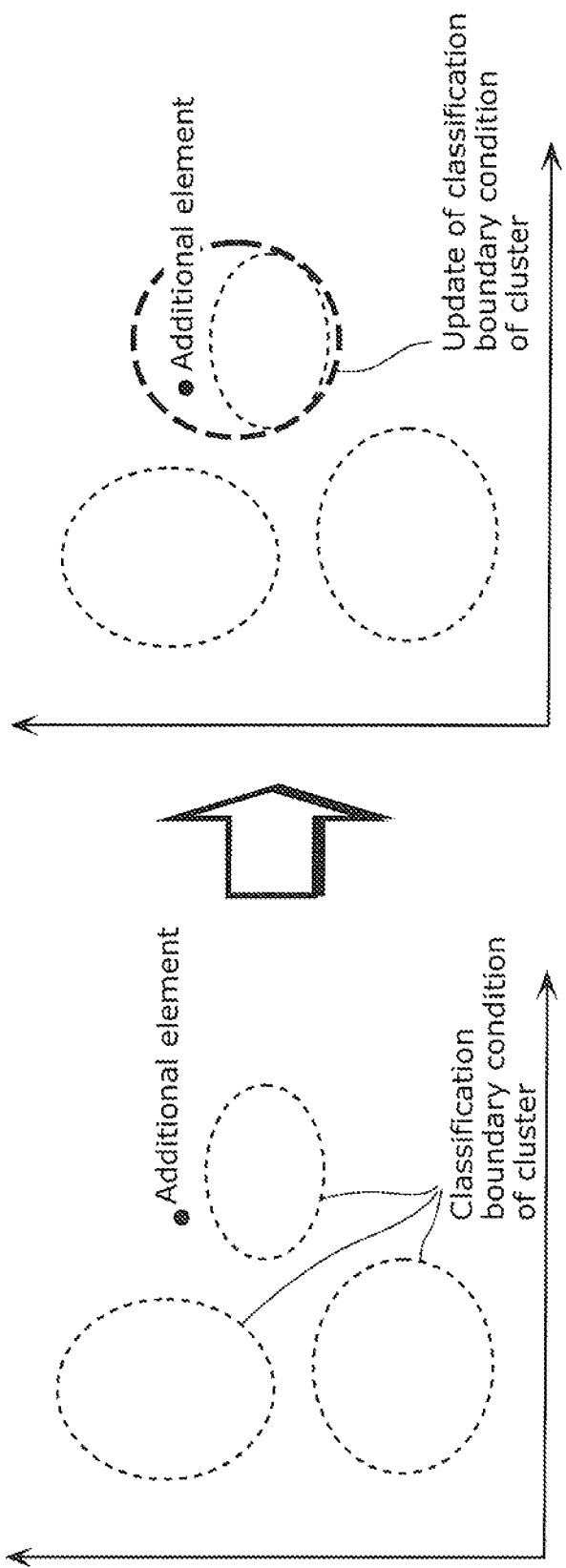

FIG. 13

|  | Data Set (A) | Data Set (B) |
|---|---|---|
| Sequential processing method with update condition | 83.6% | 80.1% |
| Batch processing method without update condition | 87.3% | 85.3% |

FIG. 20

|  | Data Set (A) | Data Set (B) |
|---|---|---|
| Classification merging method with update condition | 88.7 % | 84.1 % |
| Sequential processing method with update condition | 83.6 % | 80.1 % |
| Batch processing method without update condition | 87.3 % | 85.3 % |

Constrained merging method (improved)

Constrained sequential updating method (conventional)

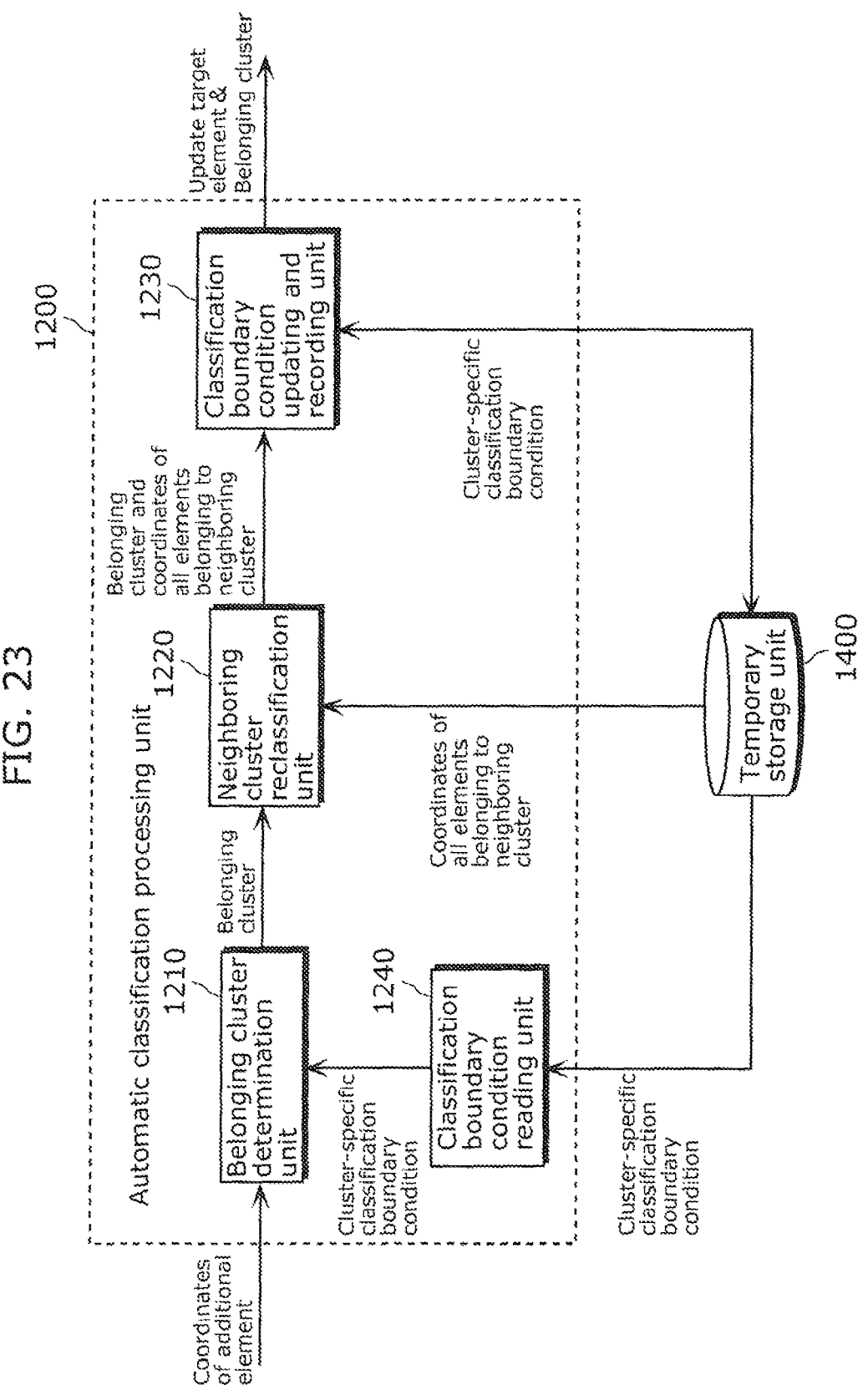

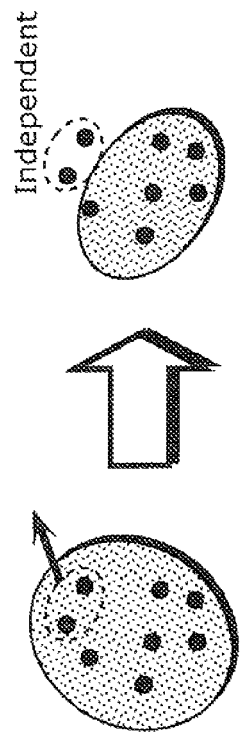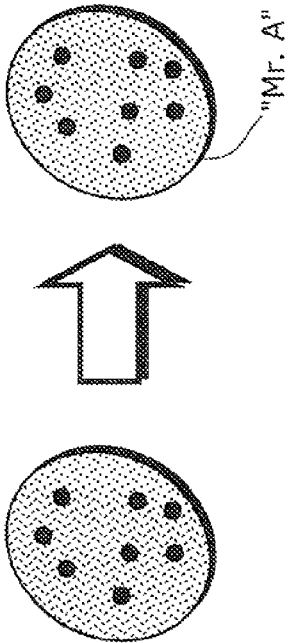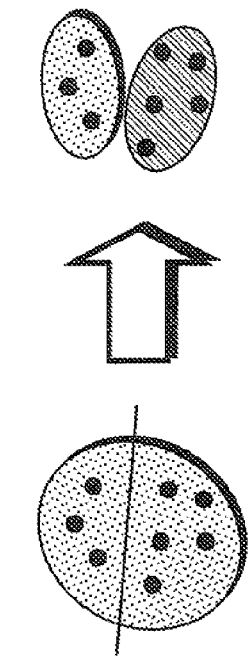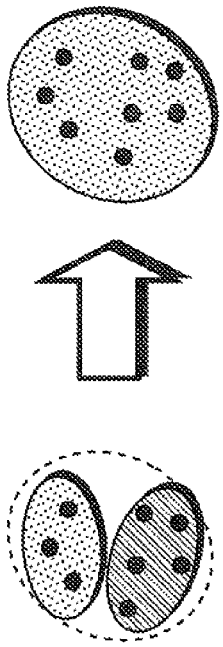

FIG. 32

DATA PROCESSING APPARATUS, DATA PROCESSING METHOD, PROGRAM, AND INTEGRATED CIRCUIT

TECHNICAL FIELD

The present invention relates to a data processing apparatus and processing method based on a premise that sequential input data can be automatically classified and also the result of the classification can be manually corrected (annotated).

BACKGROUND ART

As automatic data classification techniques, a method of recognizing and classifying data using prior learning data and a method of classifying data without using prior learning data are conventionally known. Both methods are realized by extracting feature values of a plurality of dimensions from data and conducting feature value comparison.

As one example of prior learning, there is a method (for instance, Bayesian estimation) of computing a probability distribution from distribution information of learning data for each classification group, in order to determine which classification group input data belongs to. As another example, there is a method (for instance, a Gaussian mixture model) of approximating distribution information of learning data to a mixture of a plurality of Gaussian distributions, in order to determine which classification group input data belongs to. As still another example, there is a method (for instance, a support vector machine) of setting boundaries between classification groups from distribution information of learning data, in order to determine which classification group input data belongs to. In these methods, learning data needs to be manually prepared before implementing automatic classification, which requires complex registration operations.

On the other hand, as the method of automatically classifying data without using prior learning data, various clustering methods are known. Clustering is a technique of classifying data on the basis of density of distribution of the data itself. Specific examples of the clustering methods include k-means clustering that specifies the number of classes beforehand to perform classification, and a self-organizing map (SOM) which is a neural network that autonomously acquires classification ability according to similarity of an input pattern group.

Moreover, learning and classification of sequential processing type are often demanded in automatic classification of data. As an example, the Linde-Buzo-Gray (LBG) algorithm based on the k-means method is known. For instance, the LBG algorithm is applied to vector quantization that adaptively describes, as code, which representative vector represents each vector, for information compression of an audio signal or an image signal. In a practical sense, however, the LBG algorithm is a technique of finding the representative vector by repeatedly processing data. Accordingly, even though it is sequential processing, there is a problem that a considerable amount of processing time is required. In general, classification accuracy is in a tradeoff relation with a classification result updating speed in sequential processing.

The following describes an example of a structure and processing when actually employing such an automatic classification technique, with reference to FIGS. 22 and 23. FIG. 22 is a block diagram of a data processing apparatus 1000 that performs automatic classification and records the result of the automatic classification in a temporary storage unit. In detail, the data processing apparatus 1000 shown in FIG. 22 includes a feature extraction unit 1100, an automatic classification processing unit 1200, a cluster-element correspondence table updating and recording unit 1300, and a temporary storage unit 1400.

The feature extraction unit 1100 performs, upon input of newly added element data (hereafter also referred to as "additional element"), feature extraction in order to compute coordinates of the additional element on a feature space. For instance, in the case of face image classification, a Gabor wavelet feature value or the like representing a feature value of a face is used. Information about the additional element and the feature value are recorded and managed in the temporary storage unit 1400 so that their correspondence relation is clear.

The automatic classification processing unit 1200 reads, from the temporary storage unit 1400, a classification boundary condition of each cluster obtained as a result of past classification and coordinate information of all element data belonging to a neighboring is cluster on the feature space, when the feature value of the additional element is computed. The automatic classification processing unit 1200 determines which cluster the additional element belongs to. The automatic classification processing unit 1200 then sends information of the additional element (update target element) and information of the cluster (belonging cluster) to which the additional element belongs, to the cluster-element correspondence table updating and recording unit 1300.

After this, the automatic classification processing unit 1200 modifies past classification results according to the addition of the additional element. The automatic classification processing unit 1200 records the modified classification boundary condition of the cluster and the coordinate data of all element data including the coordinates of the additional element, in the temporary storage unit 1400 by one operation. An example of a detailed structure and processing of the automatic classification processing unit 1200 will be described later.

The cluster-element correspondence table updating and recording unit 1300 reads a past cluster-element correspondence table stored in the temporary storage unit 1400, updates the cluster-element correspondence table for the changed part, and records the updated correspondence table in the temporary storage unit 1400.

FIG. 23 is a diagram showing an example of a detailed structure and processing of the automatic classification processing unit 1200. The automatic classification processing unit 1200 shown in FIG. 23 includes a belonging cluster determination unit 1210, a neighboring cluster reclassification unit 1220, a classification boundary condition reading unit 1240, and a classification boundary condition updating and recording unit 1230.

The belonging cluster determination unit 1210 reads the past classification boundary condition of each cluster from the temporary storage unit 1400 through the classification boundary condition reading unit 1240, upon input of the additional element. The belonging cluster determination unit 1210 performs matching in order to determine how close the additional element is to each cluster. As one example, the above-mentioned LBG algorithm based on the k-means method that sequentially performs automatic classification of data without using prior learning data is used for matching. As another example, a hierarchical automatic classification technique or a support vector machine (SVM) capable of sequential processing may be used. For instance, in the SVM, the classification boundary condition is a function indicating a classification boundary surface between clusters. In the hierarchical automatic classification technique, the classification boundary condition is a branch condition at each hierarchical level and each node. Alternatively, as in a Gaussian mixture model (GMM) using prior learning data, each cluster may have a probability density function distributed on the feature space. That is, the classification boundary condition may be any information, so long as it shows a condition for determining which cluster new element data belongs to.

The neighboring cluster reclassification unit 1220 receives the coordinates of the additional element on the feature space and a matching result of the additional element obtained by the belonging cluster determination unit 1210, and extracts the neighboring cluster of the additional element. A cluster is determined as the neighboring cluster when a distance from the additional element to the cluster is smaller than an arbitrary distance index set beforehand. The neighboring cluster reclassification unit 1220 reads all element data belonging to the neighboring cluster from the temporary storage unit 1400, and performs reclassification together with the additional element.

The classification boundary condition updating and recording unit 1230 updates the classification boundary condition of the neighboring cluster and the classification boundary conditions of the existing clusters, on the basis of information of the cluster to which each piece of element data belongs as a result of reclassification and the coordinates of each piece of element data read from the temporary storage unit 1400. The classification boundary condition updating and recording unit 1230 records the updated classification boundary conditions in the temporary storage unit 1400. Moreover, for the element data subject to modification as a result of reclassification, the classification boundary condition updating and recording unit 1230 sends information about the element data and the eventual belonging cluster, to the cluster-element correspondence table updating and recording unit 1300.

Note that, in the case where the neighboring cluster reclassification unit 1220 determines that a distance from the additional element to each cluster is larger than the preset distance index, the neighboring cluster reclassification unit 1220 generates a new cluster to which the element data belongs, and the classification boundary condition updating and recording unit 1230 performs the classification boundary condition update in the same way as above.

The temporary storage unit 1400 is a hard disk, an optical disc, a semiconductor memory, or the like capable of temporarily storing data.

According to such a structure, even when data is sequentially added, the automatic classification result of the newly added data can be reflected while holding past automatic classification results.

Note that, since such an automatic data classification technique employs a statistical approach, the classification result of 100% in accuracy cannot normally be obtained, and the result can merely be probabilistically estimated. This raises a need to successfully analyze the obtained result depending on applications. There is also a system structure based on a premise that the result of automatic classification is manually corrected by the user. In this system, automatic data classification serves as "assistance when the user manually classifies a large amount of data".

For example, in the case of face image classification, U.S. Pat. No. 7,274,822 and U.S. Pat. No. 7,403,642 describe automatic classification techniques and user interfaces for accurate, efficient annotation (manual classification correction by the user) of face photographs. FIGS. 24A to 24D show examples of annotation.

In FIGS. 24A to 24D, element data subject to classification is indicated by a black spot, and a classification result is indicated by a line. Hereafter, a unit of classification result is referred to as a cluster. Specific examples of annotation include: a splitting operation of splitting one cluster obtained as a result of classification into two (FIG. 24A); a merging operation of merging two clusters into one (FIG. 24B); a removal operation of removing arbitrary element data from one cluster so as to be independent (FIG. 24C); and a metadata assigning operation of assigning a name or information to an entire cluster (FIG. 24D).

The following describes an example of a structure and processing of the data processing apparatus 1000 necessary for performing such annotation, with reference to FIG. 25. The data processing apparatus 1000 shown in FIG. 25 includes the cluster-element correspondence table updating and recording unit 1300, the temporary storage unit 1400, and a user alteration operation detection unit 1500. Note that the cluster-element correspondence table updating and recording unit 1300 and the temporary storage unit 1400 have the same specific structures as described above. Components not directly related to annotation processing are not shown in FIG. 25.

The user alteration operation detection unit 1500 notifies, upon detecting that the user starts an annotation operation, the cluster-element correspondence table updating and recording unit 1300 of the annotation operation. Upon receiving the notification, the cluster-element correspondence table updating and recording unit 1300 reads the cluster-element correspondence table obtained as a result of past classification from the temporary storage unit 1400, to enable recognition of which element data and how the element data has been altered by the user.

The user alteration operation detection unit 1500 then sends information showing the contents of alteration actually made by the user, to the cluster-element correspondence table updating and recording unit 1300. The cluster-element correspondence table updating and recording unit 1300 updates the cluster-element correspondence table using the received information that shows the contents of alteration, and records the updated cluster-element correspondence table in the temporary storage unit 1400.

According to such a structure, it is possible to store and search for annotation results.

In a system of automatically classifying a large amount of data, not only the classification technique but also how classification results are managed is important in practical use. That is, it is necessary to manage automatic classification results by some method that facilitates search, thereby promptly presenting the results upon search. In other words, a high search speed is required. Note that the search speed is closely related to the classification result updating speed mentioned above with regard to the classification technique of sequential processing type. This is because, when partially updating the classification results, a procedure of extracting only the corresponding data, updating the data, and recording the updated data is needed.

To increase the classification result updating speed, a data management method that enables partial classification result updates is necessary. As a representative data management method satisfying such a condition, a method using a hierarchical tree structure is typically known. FIG. 26 shows an example of hierarchical classification. Each cluster is classified in a hierarchical structure, where a lower hierarchical level shows a grouping of relatively close (similar) clusters, and a higher hierarchical level shows classification of clusters in a coarser unit.

The following describes an example of a structure of the data processing apparatus 1000 necessary for performing such search, with reference to FIG. 27. The data processing apparatus 1000 shown in FIG. 27 includes a display cluster determination unit 1600, a cluster-element relation search unit 1700, a display unit 1800, and the temporary storage unit 1400. Note that the temporary storage unit 1400 has the same specific structure as described above. Components not directly related to search processing are not shown in FIG. 27.

The display cluster determination unit 1600 determines a cluster to be displayed according to a user operation or the like, and sends information of the cluster to the cluster-element relation search unit 1700. The cluster-element relation search unit 1700 reads the cluster-element correspondence table obtained as a result of past classification, from the temporary storage unit 1400. The cluster-element relation search unit 1700 performs a query using the received display target cluster, to search for element data belonging to the cluster. After the search, the cluster-element relation search unit 1700 sends display element information showing the target element data, to the display unit 1800. The display unit 1800 displays element-related information about the element data read from the temporary storage unit 1400, on the basis of the display element information.

According to such a structure, automatic classification results and annotation results can be used upon search.

CITATION LIST

Patent Literature

[PTL 1]
U.S. Pat. No. 7,274,822
[PTL 2]
U.S. Pat. No. 7,403,642

SUMMARY OF INVENTION

Technical Problem

However, there is conventionally no data management method that achieves both automatic classification of sequential processing type and manual classification by the user.

U.S. Pat. No. 7,274,822 and U.S. Pat. No. 7,403,642 describe image data management methods based on folder structures, but do not support sequential processing. For example, for each added element data set (M elements, N elements, and P elements are sequentially added), closed automatic classification is performed within the individual element data set, as shown in FIG. 28. That is, matching and merging with past classification results and matching with classification correction results manually made by the user are not automatically performed. It is only possible to manually perform, by the user, matching between past automatic classification results and annotation results. Note that FIG. 28 shows a state where processing is performed from left to right in chronological order.

According to such a structure and processing, for example in an actual use environment where new image groups are added one after another, automatic classification does not function and more reliance is placed on the user's merging operations. This causes a limited assistance effect of automatic classification, in organization of a large amount of data.

On the other hand, as shown in FIG. 29, there may be a form in which, each time an added data set is automatically classified, updating is performed in consideration of the past automatic classification results (sequential processing is performed), and also annotation is performed in consideration of the past results. In this case, however, two problems arise. The first problem is that consistency between the automatic classification results and the annotation information is lost as a result of inheriting the past results.

FIG. 30 shows an example of this problem. In FIG. 30, as a result of past automatic classification, element 0 is classified into cluster 0, elements 1 and 2 are classified into cluster 1, elements 3 and 4 are classified into cluster 2, and element 5 is classified into cluster 3. Moreover, as a result of annotation by the user, clusters 0 and 1 are corrected to be the same cluster, and clusters 2 and 3 are corrected to be the same cluster.

Next, new element 6 is added, and re-clustering is performed according to an automatic classification algorithm. Since close elements are clustered together, cluster 4 including elements 1, 3, and 6 is newly generated, and cluster 0 including element 0, cluster 1 including element 2, cluster 2 including element 4, and cluster 3 including element 5 are obtained as a result.

In the past annotation, the user performed the operation so that elements 0, 1, and 2 belong to the same cluster and elements 3, 4, and 5 belong to the same cluster. This being so, the addition of new element 6 creates a problem as to whether the two clusters (the cluster including elements 0, 1, and 2 and the cluster including elements 3, 4, and 5) are to be merged or separated.

When priority is placed on the annotation result and merging is selected, there is a possibility that large clusters are generated more and more. On the other hand, when priority is placed on the automatic classification result and separation is selected, the annotation result is ignored, which makes a bad impression on the user. Besides, there is also a problem as to how cluster 4 is to be treated. Thus, it is impossible to unqualifiedly determine how to achieve consistency.

The second problem is a significant decrease in the classification result updating speed when added element data is automatically classified or when an annotation operation is performed by the user, or the speed when search is performed on the basis of the past classification results (relations between clusters and element data). A reason for this is described below, with reference to FIGS. 31 and 32. Note that the following description is predicated on the example shown in FIG. 30.

The result of automatic classification is shown in the left of FIG. 31. In this case, the cluster-element correspondence table shown in the left of FIG. 32 is obtained. Next, suppose annotation is performed as shown in the middle of FIG. 31. To reflect the result of the annotation on the cluster-element correspondence table, underlined changes in italics shown in the middle of FIG. 32 are necessary. When the number of pieces of element data subject to change is larger, a larger number of updates are needed. Processes required for such updates are element data sorting and cluster ID rewriting.

Next, when new element data is added and automatically classified as shown in the right of FIG. 31, the cluster-element correspondence table needs to be updated as shown in the right of FIG. 32. Necessary updates are underlined in italics, too. In this case, element data addition (addition to the bottom of the table) and cluster ID updating are needed. Thus, in the case where the cluster-element correspondence table is frequently updated, a decrease in processing speed occurs when a large number of pieces of element data are subject to updating. Besides, a decrease in processing speed is also caused by an increase in a total number of pieces of element data as a parameter (that is, the number of rows in the table). Hence, this data management method is problematic in the case where a large amount of data needs to be classified.

As shown in FIG. 33, there may also be a form in which, each time an added element data set is automatically classified, updating is performed only in consideration of the past annotation results (sequential processing is performed). In this case, there is a problem that the past annotation information affects the next automatic classification, which can incur performance degradation as a side effect. This problem is described below, with reference to FIG. 34. FIG. 34 is a diagram showing arrangement of element data on a feature space.

The result of past automatic classification is shown in the left of FIG. 34. Suppose this automatic classification result is annotated so that clusters 0 and 3 are the same cluster, as shown in the middle of FIG. 34. To reflect the result of the annotation on the automatic classification result, spatial deformation by projection is necessary as shown in the right of FIG. 34. That is, spatial deformation is made so that old clusters 0 and 3 are treated as being close in distance. This allows the annotation result to be reflected on the subsequent automatic classification result. However, there is a problem that such deformation can cause wrong classification of element data. In the right of FIG. 34, element data originally not belonging to any cluster but now belonging to a cluster due to spatial deformation is indicated by a white spot. This has a high likelihood of being wrong classification, which can be regarded as a side effect of spatial deformation.

For instance, in the case of face images, there is a possibility that two face images of the same person are positioned at distant coordinates, due to differences in the amount of sunshine, the face orientation, and the like. When spatial deformation (or projection) is made in order to classify the two face images into the same cluster by annotation, even a face image of a different person is likely to be included in that cluster.

FIG. 35 shows a simplest possible form. In this form, each time element data is added, annotation results are abandoned. However, such a processing method is not very favorable because the user can be discouraged from performing annotation.

In view of the above problems, the present invention has an object of providing a data processing apparatus that realizes data management for achieving both automatic classification of sequential processing type and manual classification by the user, without contradiction between annotation results and automatic classification results.

Solution to Problem

A data processing apparatus according to one form of the present invention classifies element data. In detail, the data processing apparatus includes: a temporary storage unit that stores therein element data, a cluster-element correspondence table, classification boundary conditions, and a group-cluster correspondence table, the cluster-element correspondence table showing correspondence between a cluster ID for identifying each of a plurality of clusters classified by the data processing apparatus and an element ID for identifying element data that belongs to the cluster identified by the cluster ID, the classification boundary conditions each defining a boundary of a different one of the plurality of clusters, and the group-cluster correspondence table showing correspondence between a group ID for identifying a group classified according to a user's subjective criterion and a cluster ID for identifying a cluster that belongs to the group identified by the group ID; a feature extraction unit that extracts a feature value of newly added element data; an automatic classification processing unit that determines, by comparing the feature value extracted by the feature extraction unit with the classification boundary conditions, a belonging cluster to which the newly added element data belongs from among the plurality of clusters, and updates, according to a predetermined constraint, a classification boundary condition defining a boundary of the belonging cluster so that the newly added element data is included in the belonging cluster; and a data management unit that records an element ID for identifying the newly added element data and a cluster ID for identifying the belonging cluster determined by the automatic classification processing unit, in the cluster-element correspondence table in correspondence with each other.

According to the above structure, the results of automatic classification by the data processing apparatus are held in the cluster-element correspondence table, and the results of annotation are held in the group-cluster correspondence table. This makes it possible to prevent any contradiction between automatic classification and annotation.

As one example, the predetermined constraint may be a condition that prohibits merging existing clusters with each other to generate a new cluster. As another example, the predetermined constraint may be a condition that prohibits splitting a part of an existing cluster to generate a new cluster. Hence, an efficient data management method that achieves both automatic classification of sequentially added element data and manual classification by the user can be established. As a result, a function of assisting the user in classification of a large amount of data while maintaining high accuracy can be provided.

Moreover, the automatic classification processing unit may include: a classification boundary condition reading unit that reads the classification boundary condition of each cluster from the temporary storage unit; a belonging cluster determination unit that determines the belonging cluster to which the newly added element data belongs, by comparing the feature value extracted by the feature extraction unit with the classification boundary condition of each cluster read by the classification boundary condition reading unit; a cluster-element ID management unit that causes the data management unit to update the cluster-element correspondence table, on the basis of a result of the determination by the belonging cluster determination unit; and a classification boundary condition updating and recording unit that updates, on the basis of the result of the determination by the belonging cluster determination unit, the classification boundary condition defining the boundary of the belonging cluster according to the predetermined constraint, and records the updated classification boundary condition in the temporary storage unit.

Moreover, the data management unit may include: a first cluster-element correspondence table updating and recording unit that: in the case where the automatic classification processing unit determines that the newly added element data belongs to an existing cluster, adds the element ID of the newly added element data and a cluster ID of the existing cluster to the cluster-element correspondence table in correspondence with each other; and in the case where the automatic classification processing unit determines that the newly added element data does not belong to any existing cluster, adds the element ID of the newly added element data and a newly numbered cluster ID to the cluster-element correspondence table in correspondence with each other; and a group-cluster correspondence table addition unit that, in the case where the automatic classification processing unit determines that the newly added element data does not belong to any existing cluster, adds the newly numbered cluster ID and a newly numbered group ID to the group-cluster correspondence table in correspondence with each other.

Thus, the data management unit can reflect the results of automatic classification by the automatic classification processing unit on each correspondence table, merely by adding recording data to the table. This contributes to a higher processing speed. In addition, since the past classification results are not changed (that is, the existing recording data is not updated), any contradiction between automatic classification and annotation can be prevented.

Moreover, the data processing apparatus may further include a user alteration operation detection unit that detects an operation of altering a correspondence relation between a group ID and an element ID by the user. The data management unit may then update at least the group-cluster correspondence table, on the basis of a result of the detection by the user alteration operation detection unit.

Moreover, the data management unit may include: a group-cluster correspondence table updating and recording unit that extracts, from the cluster-element correspondence table, a cluster ID corresponding to the element ID detected by the user alteration operation detection unit, and updates a correspondence relation between the extracted cluster ID and the group ID detected by the user alteration operation detection unit in the group-cluster correspondence table; and a second cluster-element correspondence table updating and recording unit that, only in the case where a correspondence relation between the cluster ID and the element ID needs to be changed as a result of the alteration of the correspondence relation between the group ID and the element ID detected by the user alteration operation detection unit, updates the correspondence relation between the cluster ID and the element ID in the cluster-element correspondence table.

Moreover, the data processing apparatus may include: a display group determination unit that generates display group information including at least one group ID; a group-cluster relation search unit that extracts, from the group-cluster correspondence table, a cluster ID corresponding to the group ID included in the display group information, and generates display cluster information including the extracted cluster ID; a cluster-element relation search unit that extracts, from the cluster-element correspondence table, an element ID corresponding to the cluster ID included in the display cluster information, and generates display element information including the extracted element ID; and a display unit that reads element data identified by the element ID included in the display element information from the temporary storage unit, and displays the read element data.

Moreover, in the case where a first element data set and a second element data set each of which includes two or more pieces of element data are inputted to the data processing apparatus, the automatic classification processing unit may execute processing of determining the belonging cluster and updating the classification boundary condition, on each of the first element data set and the second element data set independently. The data processing apparatus may then further include a classification merging unit that merges classification boundary conditions updated in the processing of the first element data set and classification boundary conditions updated in the processing of the second element data set, after the processing is completed for all pieces of element data. In this way, even in the case where the constraint is placed in classification boundary condition updating during automatic classification, performance degradation of automatic classification can be efficiently suppressed.

A data processing apparatus according to one form of the present invention classifies element data. In detail, the data processing apparatus includes: a temporary storage unit that stores therein element data, a cluster-element correspondence table, classification boundary conditions, and a group-cluster correspondence table, the cluster-element correspondence table showing correspondence between a cluster ID for identifying each of a plurality of clusters classified by the data processing apparatus and an element ID for identifying element data that belongs to the cluster identified by the cluster ID, the classification boundary conditions each defining a boundary of a different one of the plurality of clusters, and the group-cluster correspondence table showing correspondence between a group ID for identifying a group classified according to a user's subjective criterion and a cluster ID for identifying a cluster that belongs to the group identified by the group ID; a user alteration operation detection unit that detects an operation of altering a correspondence relation between a group ID and an element ID by the user; and a data management unit that updates at least the group-cluster correspondence table, on the basis of a result of the detection by the user alteration operation detection unit.

A data processing apparatus according to one form of the present invention classifies element data. In detail, the data processing apparatus includes: a temporary storage unit that stores therein element data, a unit-element correspondence table, and classification boundary conditions, the unit-element correspondence table showing correspondence between a unit ID for identifying each of a plurality of units classified by the data processing apparatus and an element ID for identifying element data that belongs to the unit identified by the unit ID, and the classification boundary conditions each defining a boundary of a different one of the plurality of units; a feature extraction unit that extracts a feature value of newly added element data; a hierarchical classification processing unit that determines, by comparing the feature value extracted by the feature extraction unit with the classification boundary conditions, a belonging unit to which the newly added element data belongs from among the plurality of units, and updates, according to a predetermined constraint, a classification boundary condition defining a boundary of the belonging unit so that the newly added element data is included in the belonging unit; and a data management unit that records an element ID for identifying the newly added element data and a unit ID for identifying the belonging unit determined by the hierarchical classification processing unit, in the unit-element correspondence table in correspondence with each other. In the case where a first element data set and a second element data set each of which includes two or more pieces of element data are inputted to the data processing apparatus, the hierarchical classification processing unit executes processing of determining the belonging unit and updating the classification boundary condition, on each of the first element data set and the second element data set independently. The data processing apparatus further includes a hierarchical classification merging unit that merges classification boundary conditions updated in the processing of the first element data set and classification boundary conditions updated in the processing of the second element data set.

Moreover, the data processing apparatus may further include a clustering unit that generates a cluster that includes a plurality of units, and determines a classification boundary condition defining a boundary of the cluster. The hierarchical classification processing unit may then determine a belonging cluster to which the newly added element data belongs by comparing the feature value with the classification boundary condition of the cluster, and further determine the belonging unit by comparing the feature value with a classification boundary condition of each of the plurality of units included in the belonging cluster. This allows for hierarchical management of the classification boundary conditions, with it being possible to increase the processing speed of automatic classification.

Moreover, the hierarchical classification processing unit may include: a belonging unit determination unit that determines the belonging unit to which the newly added element data belongs, by comparing the feature value extracted by the feature extraction unit with the classification boundary condition of each unit read from the temporary storage unit; a unit-element ID management unit that updates the unit-element correspondence table, on the basis of a result of the determination by the belonging unit determination unit; and a hierarchical classification boundary condition updating and recording unit that updates, on the basis of the result of the determination by the belonging unit determination unit, the classification boundary condition defining the boundary of the belonging unit according to the predetermined constraint, and records the updated classification boundary condition in the temporary storage unit.

As one example, the predetermined constraint may be a condition that prohibits merging existing units with each other to generate a new unit, or a condition that prohibits splitting a part of an existing unit to generate a new unit.

A data processing method according to one form of the present invention is a method for classifying element data in a data processing apparatus including a temporary storage unit that stores therein element data, a cluster-element correspondence table, classification boundary conditions, and a group-cluster correspondence table, the cluster-element correspondence table showing correspondence between a cluster ID for identifying each of a plurality of clusters classified by the data processing apparatus and an element ID for identifying element data that belongs to the cluster identified by the cluster ID, the classification boundary conditions each defining a boundary of a different one of the plurality of clusters, and the group-cluster correspondence table showing correspondence between a group ID for identifying a group classified according to a user's subjective criterion and a cluster ID for identifying a cluster that belongs to the group identified by the group ID. In detail, the data processing method includes: extracting a feature value of newly added element data; determining, by comparing the feature value extracted in the extracting with the classification boundary conditions, a belonging cluster to which the newly added element data belongs from among the plurality of clusters, and updating, according to a predetermined constraint, a classification boundary condition defining a boundary of the belonging cluster so that the newly added element data is included in the belonging cluster; and recording an element ID for identifying the newly added element data and a cluster ID for identifying the belonging cluster determined in the determining, in the cluster-element correspondence table in correspondence with each other.

A data processing method according to another form of the present invention is a method for classifying element data in a data processing apparatus including a temporary storage unit that stores therein element data, a unit-element correspondence table, and classification boundary conditions, the unit-element correspondence table showing correspondence between a unit ID for identifying each of a plurality of units classified by the data processing apparatus and an element ID for identifying element data that belongs to the unit identified by the unit ID, and the classification boundary conditions each defining a boundary of a different one of the plurality of units. In detail, the data processing method includes: extracting a feature value of newly added element data; determining, by comparing the feature value extracted in the extracting with the classification boundary conditions, a belonging unit to which the newly added element data belongs from among the plurality of units, and updating, according to a predetermined constraint, a classification boundary condition defining a boundary of the belonging unit so that the newly added element data is included in the belonging unit; and recording an element ID for identifying the newly added element data and a unit ID for identifying the belonging unit determined in the determining, in the unit-element correspondence table in correspondence with each other. In the case where a first element data set and a second element data set each of which includes two or more pieces of element data are inputted to the data processing apparatus, the determining includes executing processing of determining the belonging unit and updating the classification boundary condition, on each of the first element data set and the second element data set independently. The data processing method further includes merging classification boundary conditions updated in the processing of the first element data set and classification boundary conditions updated in the processing of the second element data set.

A program according to one form of the present invention causes a data processing apparatus to classify element data, the data processing apparatus including a temporary storage unit that stores therein element data, a cluster-element correspondence table, classification boundary conditions, and a group-cluster correspondence table, the cluster-element correspondence table showing correspondence between a cluster ID for identifying each of a plurality of clusters classified by the data processing apparatus and an element ID for identifying element data that belongs to the cluster identified by the cluster ID, the classification boundary conditions each defining a boundary of a different one of the plurality of clusters, and the group-cluster correspondence table showing correspondence between a group ID for identifying a group classified according to a user's subjective criterion and a cluster ID for identifying a cluster that belongs to the group identified by the group ID. In detail, the program causes the data processing apparatus to execute: extracting a feature value of newly added element data; determining, by comparing the feature value extracted in the extracting with the classification boundary conditions, a belonging cluster to which the newly added element data belongs from among the plurality of clusters, and updating, according to a predetermined constraint, a classification boundary condition defining a boundary of the belonging cluster so that the newly added element data is included in the belonging cluster; and recording an element ID for identifying the newly added element data and a cluster ID for identifying the belonging cluster determined in the determining, in the cluster-element correspondence table in correspondence with each other.

A program according to another form of the present invention causes a data processing apparatus to classify element data, the data processing apparatus including a temporary storage unit that stores therein element data, a unit-element correspondence table, and classification boundary conditions, the unit-element correspondence table showing correspondence between a unit ID for identifying each of a plurality of units classified by the data processing apparatus and an element ID for identifying element data that belongs to the unit identified by the unit ID, and the classification boundary conditions each defining a boundary of a different one of the plurality of units. In detail, the program causes the data processing apparatus to execute: extracting a feature value of newly added element data; determining, by comparing the feature value extracted in the extracting with the classification boundary conditions, a belonging unit to which the newly added element data belongs from among the plurality of units, and updating, according to a predetermined constraint, a classification boundary condition defining a boundary of the belonging unit so that the newly added element data is included in the belonging unit; and recording an element ID for identifying the newly added element data and a unit ID for identifying the belonging unit determined in the determining, in the unit-element correspondence table in correspondence with each other. In the case where a first element data set and a second element data set each of which includes two or more pieces of element data are inputted to the data processing apparatus, the determining includes executing processing of determining the belonging unit and updating the classification boundary condition, on each of the first element data set and the second element data set independently. The program further causes the data processing apparatus to execute merging classification boundary conditions updated in the processing of the first element data set and classification boundary conditions updated in the processing of the second element data set.

An integrated circuit according to one form of the present invention is provided in a data processing apparatus including a temporary storage unit that stores therein element data, a cluster-element correspondence table, classification boundary conditions, and a group-cluster correspondence table, the cluster-element correspondence table showing correspondence between a cluster ID for identifying each of a plurality of clusters classified by the data processing apparatus and an element ID for identifying element data that belongs to the cluster identified by the cluster ID, the classification boundary conditions each defining a boundary of a different one of the plurality of clusters, and the group-cluster correspondence table showing correspondence between a group ID for identifying a group classified according to a user's subjective criterion and a cluster ID for identifying a cluster that belongs to the group identified by the group ID. In detail, the integrated circuit includes: a feature extraction unit that extracts a feature value of newly added element data; an automatic classification processing unit that determines, by comparing the feature value extracted by the feature extraction unit with the classification boundary conditions, a belonging cluster to which the newly added element data belongs from among the plurality of clusters, and updates, according to a predetermined constraint, a classification boundary condition defining a boundary of the belonging cluster so that the newly added element data is included in the belonging cluster; and a data management unit that records an element ID for identifying the newly added element data and a cluster ID for identifying the belonging cluster determined by the automatic classification processing unit, in the cluster-element correspondence table in correspondence with each other.

An integrated circuit according to another form of the present invention is provided in a data processing apparatus including a temporary storage unit that stores therein element data, a unit-element correspondence table, and classification boundary conditions, the unit-element correspondence table showing correspondence between a unit ID for identifying each of a plurality of units classified by the data processing apparatus and an element ID for identifying element data that belongs to the unit identified by the unit ID, and the classification boundary conditions each defining a boundary of a different one of the plurality of units. In detail, the integrated circuit includes: a feature extraction unit that extracts a feature value of newly added element data; a hierarchical classification processing unit that determines, by comparing the feature value extracted by the feature extraction unit with the classification boundary conditions, a belonging unit to which the newly added element data belongs from among the plurality of units, and updates, according to a predetermined constraint, a classification boundary condition defining a boundary of the belonging unit so that the newly added element data is included in the belonging unit; and a data management unit that records an element ID for identifying the newly added element data and a unit ID for identifying the belonging unit determined by the hierarchical classification processing unit, in the unit-element correspondence table in correspondence with each other, In the case where a first element data set and a second element data set each of which includes two or more pieces of element data are inputted to the data processing apparatus, the hierarchical classification processing unit executes processing of determining the belonging unit and updating the classification boundary condition, on each of the first element data set and the second element data set independently. The integrated circuit further includes a hierarchical classification merging unit that merges classification boundary conditions updated in the processing of the first element data set and classification boundary conditions updated in the processing of the second element data set.

Advantageous Effects of Invention

According to the present invention, data management for achieving both automatic classification of sequential processing type and manual classification by the user can be realized to prevent any contradiction between annotation results and automatic classification results.

BRIEF DESCRIPTION OF DRAWINGS

FIG. 3 is a diagram showing group-cluster-element data relations in Embodiment 1 of the present invention.

FIG. 4A is a diagram showing a group-cluster correspondence table in Embodiment 1 of the present invention.

FIG. 4B is a diagram showing a cluster-element correspondence table in Embodiment 1 of the present invention.

FIG. 5 is a schematic diagram explaining an update of a cluster classification boundary condition in Embodiment 1 of the present invention.

FIG. 13 is a diagram comparing automatic classification performance of the conventional data processing apparatus of sequential hierarchical classification.

FIG. 20 is a diagram showing automatic classification performance of the data processing apparatus in Embodiment 4 of the present invention.

FIG. 23 is a detailed block diagram of an automatic classification processing unit in the conventional data processing apparatus in sequential automatic classification.

FIG. 24A is a schematic diagram showing a splitting operation as an example of annotation.

FIG. 24B is a schematic diagram showing a merging operation as an example of annotation.

FIG. 24C is a schematic diagram showing a removal operation as an example of annotation.

FIG. 24D is a schematic diagram showing a metadata assigning operation as an example of annotation.

FIG. 32 is a diagram showing cluster-element correspondence in the operation procedure shown in FIG. 29.

DESCRIPTION OF EMBODIMENTS

The following describes embodiments of the present invention with reference to drawings.

Embodiment 1

The following describes a data processing apparatus in Embodiment 1 of the present invention, with reference to FIGS. 1 to 5.

Figure 1:
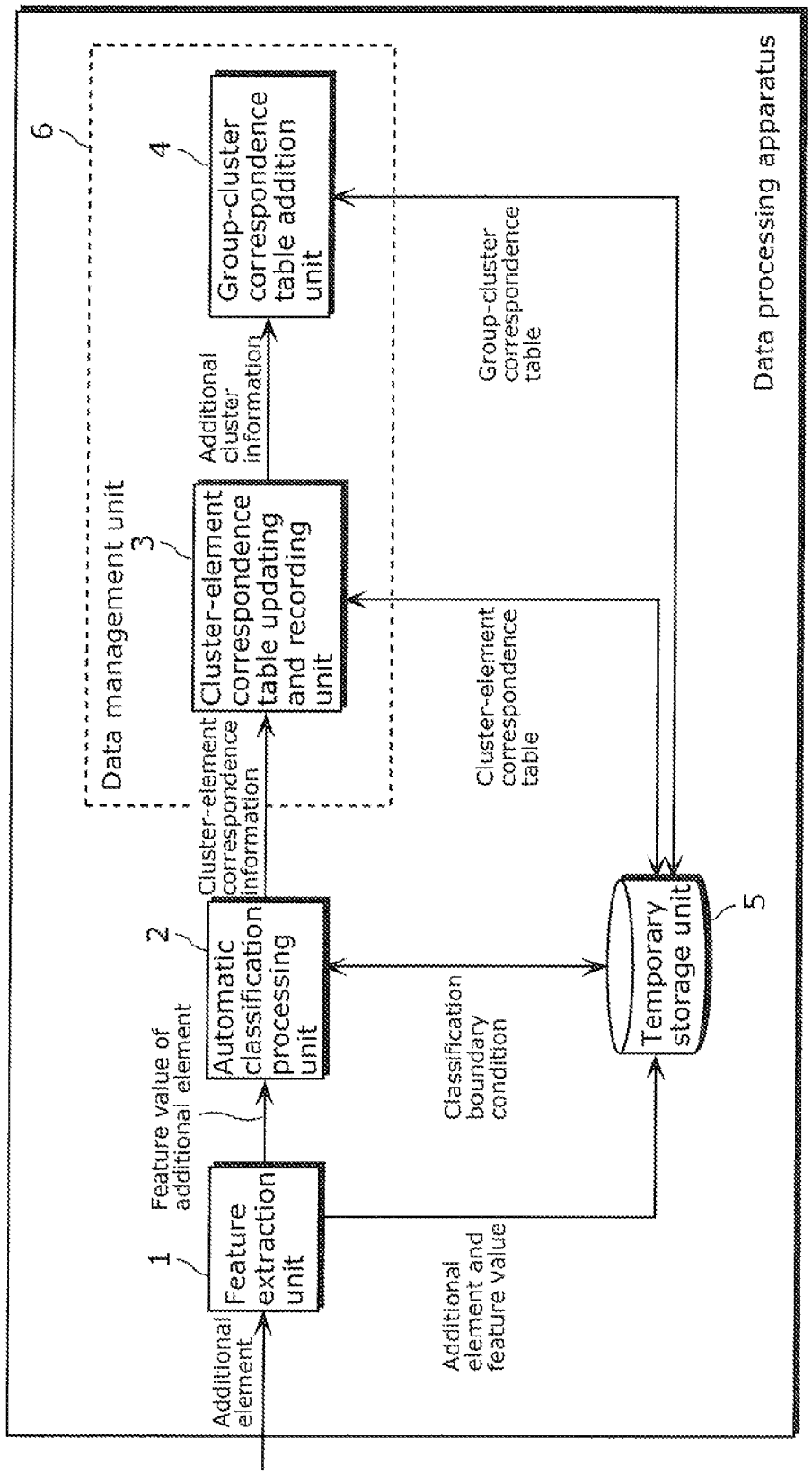
FIG. 1 is a block diagram of a data processing apparatus in Embodiment 1 of the present invention.

FIG. 1 shows a data processing apparatus 100 in Embodiment 1, and particularly shows components necessary when performing automatic classification. The data processing apparatus 100 shown in FIG. 1 includes a feature extraction unit 1, an automatic classification processing unit 2, a cluster-element correspondence table updating and recording unit 3, a group-cluster correspondence table addition unit 4, a temporary storage unit 5, and a data management unit 6. Note that structures of the feature extraction unit 1 and the temporary storage unit 5 are as described in the conventional examples, but are not limited only to such specific structures.

The feature extraction unit 1 extracts a feature value of element data. For example, when an image of a face of a person is inputted to the data processing apparatus 100 as the element data, the feature extraction unit 1 applies a Gabor wavelet transform to the image, thereby extracting the feature value. The feature extraction unit 1 assigns a unique element ID to the element data and the feature value of the element data, and records them in the temporary storage unit 5.

The automatic classification processing unit 2 reads a classification boundary condition of each cluster from the temporary storage unit 5, when the feature value of the additional element is computed by the feature extraction unit 1. The automatic classification processing unit 2 determines which cluster the additional element belongs to, by comparing the feature value of the additional element and the classification boundary condition of each cluster. Note that the classification boundary condition is a condition defining a boundary of each cluster, and is determined as a result of past classification.

After this, the automatic classification processing unit 2 sends cluster-element correspondence information that includes the element ID of the additional element and a cluster ID of the cluster (belonging cluster) to which the additional element belongs, to the cluster-element correspondence table updating and recording unit 3. The automatic classification processing unit 2 also updates a classification boundary condition of the belonging cluster so that the additional element is included in the belonging cluster, according to a predetermined constraint. The automatic classification processing unit 2 then records the changed classification boundary condition of the cluster and coordinates of the additional element, in the temporary storage unit 5. An example of a detailed structure and processing of the automatic classification processing unit 2 will be described later.

The cluster-element correspondence table updating and recording unit 3 reads a past cluster-element correspondence table stored in the temporary storage unit 5, and updates the cluster-element correspondence table for the changed part on the basis of the cluster-element correspondence information received from the automatic classification processing unit 2. The cluster-element correspondence table updating and recording unit 3 then records the updated cluster-element correspondence table in the temporary storage unit 5. Moreover, in the case where a new cluster is generated as a result of the addition of the element data, the cluster-element correspondence table updating and recording unit 3 sends additional cluster information about the generated new cluster, to the group-cluster correspondence table addition unit 4.

In more detail, when the automatic classification processing unit 2 determines that the newly added element data belongs to an existing cluster, the cluster-element correspondence table updating and recording unit 3 adds the element ID of the newly added element data and a cluster ID of the existing cluster, to the cluster-element correspondence table in correspondence with each other. On the other hand, when the automatic classification processing unit 2 determines that the newly added element data does not belong to any existing cluster, the cluster-element correspondence table updating and recording unit 3 adds the element ID of the newly added element data and a newly numbered cluster ID, to the cluster-element correspondence table in correspondence with each other.

The group-cluster correspondence table addition unit 4 reads a group-cluster correspondence table obtained as a result of past annotation, from the temporary storage unit 5. The group-cluster correspondence table addition unit 4 numbers a group ID so that one newly generated cluster directly corresponds to one group, and adds the group ID to the group-cluster correspondence table. The group-cluster correspondence table addition unit 4 then records the updated group-cluster correspondence table in the temporary storage unit 5. Note that the data management unit 6 includes the cluster-element correspondence table updating and recording unit 3 and the group-cluster correspondence table addition unit 4.

In detail, when the automatic classification processing unit 2 determines that the newly added element data does not belong to any existing cluster, the group-cluster correspondence table addition unit 4 adds the newly numbered cluster ID and the newly numbered group ID to the group-cluster correspondence table in correspondence with each other.

The temporary storage unit 5 stores the element data, the feature value of the element data, the cluster-element correspondence table, the classification boundary condition of each cluster, and the group-cluster correspondence table. For instance, any recording medium capable of temporarily storing data, such as a hard disk, an optical disc, or a semiconductor memory, may be used as the temporary storage unit 5, though the temporary storage unit 5 is not limited to such specific examples.

The group-cluster correspondence table shows correspondence between a group ID for identifying a group classified according to the user's subjective criterion and a cluster ID for identifying a cluster that belongs to the group identified by the group ID, as shown in FIG. 4A as an example. The cluster-element correspondence table shows correspondence between a cluster ID for identifying a different one of a plurality of clusters classified by the data processing apparatus 100 and an element ID for identifying element data that belongs to the cluster identified by the cluster ID, as shown in FIG. 4B as an example.

Figure 2:
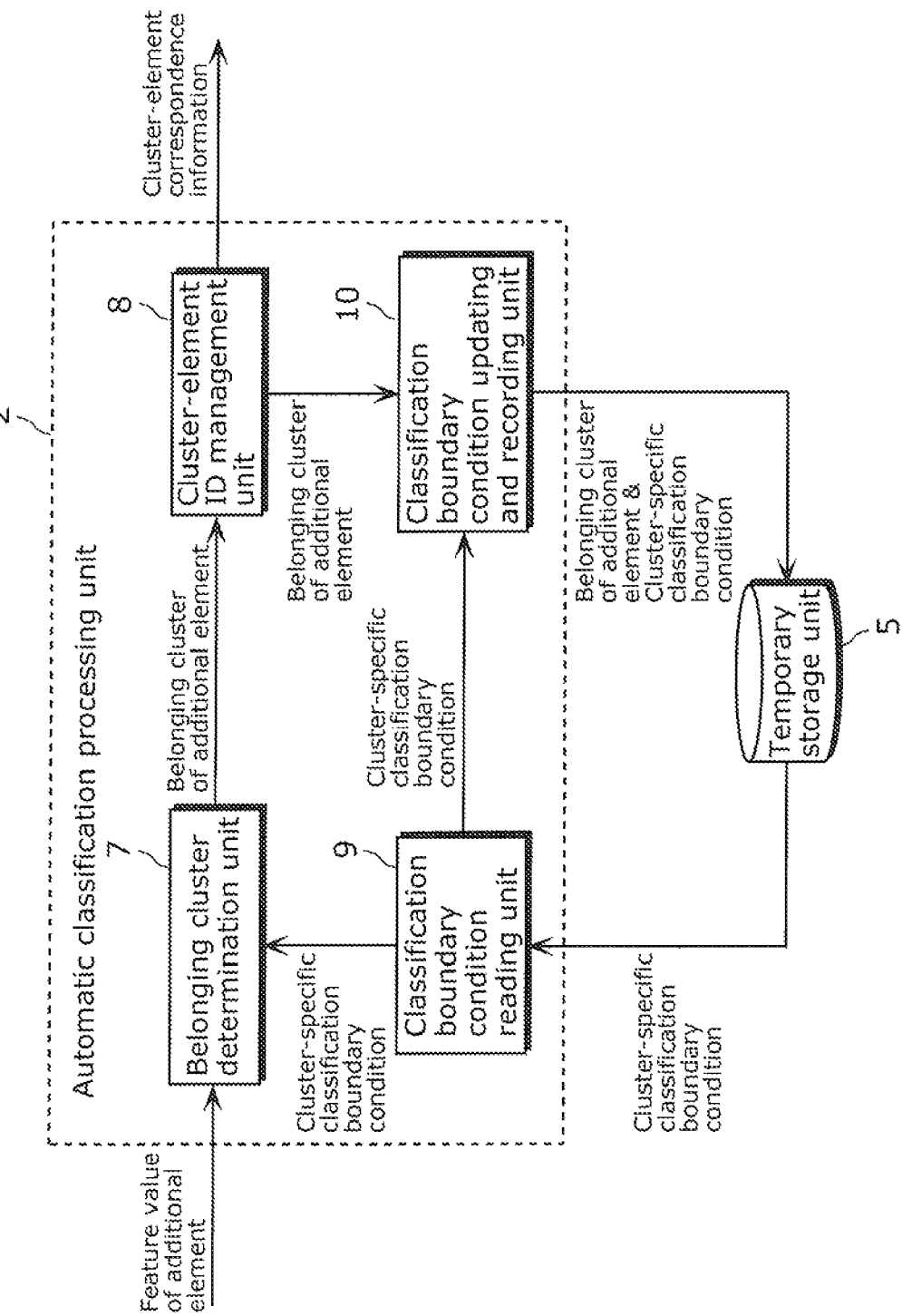
FIG. 2 is a detailed block diagram of an automatic classification processing unit in the data processing apparatus in Embodiment 1 of the present invention.

FIG. 2 shows a detailed structure of the automatic classification processing unit 2. The automatic classification processing unit 2 shown in FIG. 2 includes a belonging cluster determination unit 7, a cluster-element ID management unit 8, a classification boundary condition reading unit 9, and a classification boundary condition updating and recording unit 10. Structures and processing of the belonging cluster determination unit 7 and the classification boundary condition reading unit 9 are as described in the conventional examples, but are not limited only to such specific structures and processing.

The belonging cluster determination unit 7 receives the coordinates of the feature value of the additional element on a feature space obtained by the feature extraction unit 1, and the past classification boundary condition of each cluster read from the temporary storage unit 5 through the classification boundary condition reading unit 9. The belonging cluster determination unit 7 determines a closest cluster as a cluster to which the additional element belongs. In the case where the input feature value is determined to be far from the classification boundary conditions of all clusters by more than a predetermined distance, the belonging cluster determination unit 7 newly generates a cluster to which the additional element belongs. The belonging cluster determination unit 7 notifies the cluster-element ID management unit 8 of the belonging cluster of the additional element.

The cluster-element ID management unit 8 determines a cluster ID, on the basis of the information of the belonging cluster of the additional element received from the belonging cluster determination unit 7. For example, when the additional element is determined to belong to a new independent cluster, the cluster-element ID management unit 8 numbers a new cluster ID. When the additional element is determined to belong to an existing cluster, on the other hand, the cluster-element ID management unit 8 assigns a cluster ID of the existing cluster. The cluster-element ID management unit 8 sends information of the determined cluster ID to the data management unit 6 as the cluster-element correspondence information, to cause the data management unit 6 to update the cluster-element correspondence table.

The classification boundary condition updating and recording unit 10 reads the classification boundary condition of each cluster obtained as a result of past classification, from the temporary storage unit 5 through the classification boundary condition reading unit 9. The classification boundary condition updating and recording unit 10 modifies only a classification boundary condition relating to the cluster to which the additional element belongs. For example, suppose there is a boundary condition between clusters A and B, but there is no boundary condition between clusters A and C because clusters A and C are not adjacent to each other. In this case, when additional element a is added to cluster A, the classification boundary condition updating and recording unit 10 modifies only the classification boundary condition between clusters A and B so that additional element a is included in cluster A. A classification boundary condition setting method depends on the type of automatic classification technique mentioned earlier. The classification boundary condition updating and recording unit 10 records the updated cluster-specific classification boundary condition and the belonging cluster of the additional element, in the temporary storage unit 5.

Here, when updating the classification boundary condition of the cluster to which the additional element belongs, the classification boundary condition updating and recording unit 10 executes the updating process according to at least two constraints (also referred to as "update conditions", hereafter the same). First, merging existing clusters with each other to generate a new cluster is prohibited. For instance, element data belonging to a cluster other than the belonging cluster of the additional element before the update of the classification boundary condition is not permitted to belong to the belonging cluster of the additional element after the update of the classification boundary condition. Second, splitting a part of an existing cluster to generate a new cluster is prohibited. For instance, element data belonging to the belonging cluster of the additional element before the update of the classification boundary condition is not permitted to belong to a cluster other than the belonging cluster of the additional element after the update of the classification boundary condition.

Thus, in the automatic classification processing unit 2, the constraints (update conditions) are placed so as to prevent splitting of an existing cluster and merging of existing clusters, when element data is added to an existing cluster obtained as a result of past classification. Meanwhile, the automatic classification processing unit 2 is permitted to generate a new cluster by the additional element itself, and add the additional element to an existing cluster.

FIG. 3 is a schematic diagram showing a state where, in addition to the conventional concepts "element data" and "cluster", a new concept "group" is provided as a broader concept than "cluster". FIG. 4A is a diagram showing an example of the group-cluster correspondence table showing relations between group IDs and cluster IDs. FIG. 4B is a diagram showing an example of the cluster-element correspondence table showing relations between cluster IDs and element IDs.

That is, the cluster-element correspondence table shown in FIG. 4B is used to hold automatic classification results. On the other hand, the group-cluster correspondence table shown in FIG. 4A is used to hold annotation results. This makes it possible to support automatic reclassification by element addition. Moreover, the automatic classification processing unit 2 shown in FIG. 2 defines the update conditions (constraints) in automatic classification processing of the additional element, so that only the information relating to the cluster to which the additional element belongs is updated without significantly changing the past classification results. This contributes to a reduced computation amount of classification or data management required for updating, without a significant decrease in accuracy of automatic classification processing.

FIG. 5 is a schematic diagram showing an update by the classification boundary condition updating and recording unit 10. FIG. 5 shows a situation where, when element data is added on the feature space, a classification boundary condition of a cluster to which the additional element belongs needs to be updated. As shown in FIG. 5, a technique that does not merely update only the classification boundary condition of the belonging cluster but determines the classification boundary condition in consideration of relations with adjacent clusters may be employed. In such a case, a technique of determining the classification boundary condition on the basis of coordinates of element data constituting each cluster is typically used (for example, support vectors in a SVM).

Embodiment 2

Figure 6:
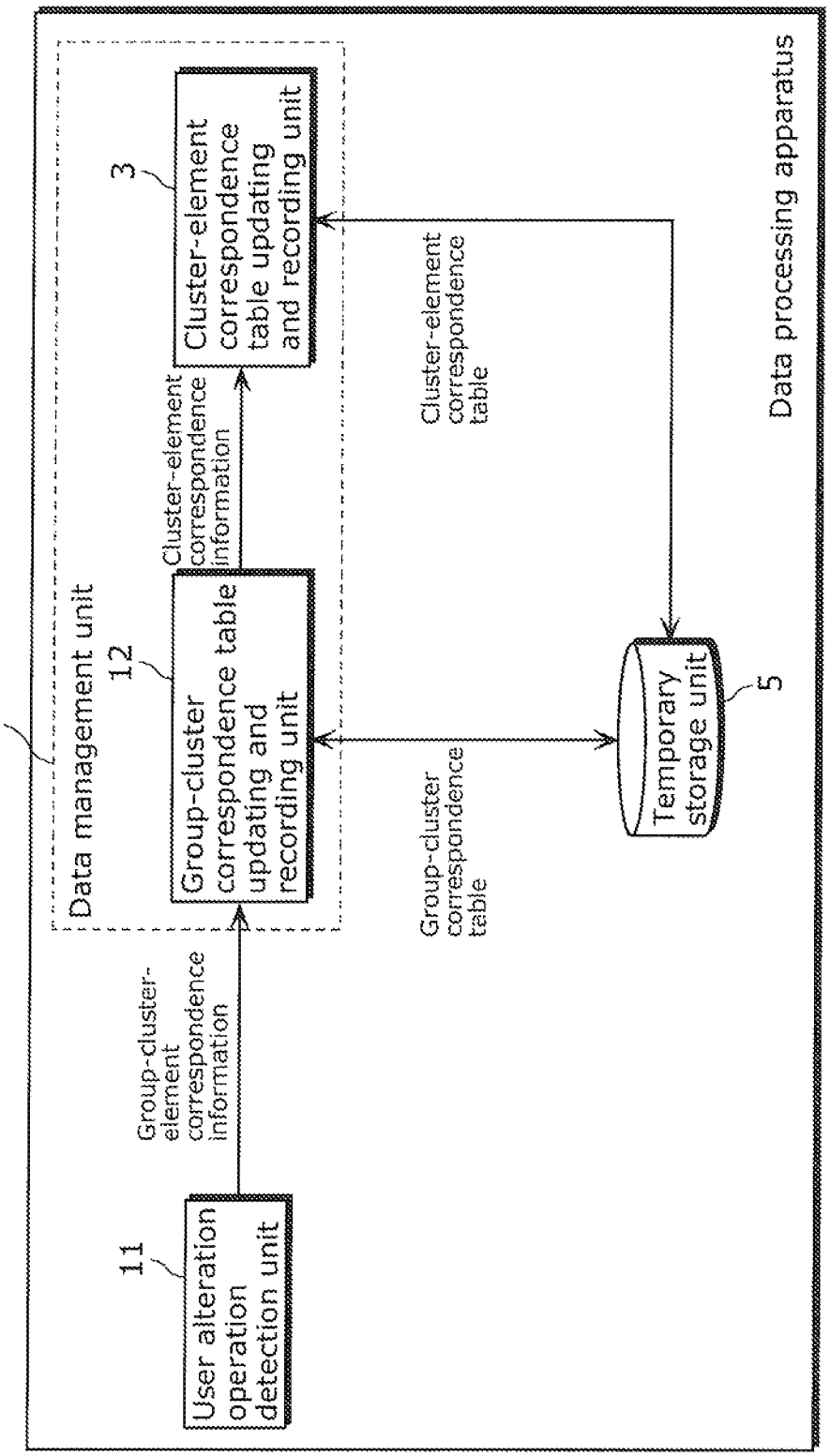
FIG. 6 is a block diagram of a data processing apparatus in Embodiment 2 of the present invention.

The following describes a data processing apparatus 200 in Embodiment 2 of the present invention, with reference to FIG. 6.

FIG. 6 shows the data processing apparatus 200 in Embodiment 2, and particularly shows components necessary when performing annotation. The data processing apparatus 200 shown in FIG. 6 includes a user alteration operation detection unit 11, a group-cluster correspondence table updating and recording unit 12, the cluster-element correspondence table updating and recording unit 3, and the temporary storage unit 5. A structure of the cluster-element correspondence table updating and recording unit 3 is as described in Embodiment 1. The data management unit 6 includes the cluster-element correspondence table updating and recording unit 3 and the group-cluster correspondence table updating and recording unit 12. Structures of the user alteration operation detection unit 11 and the temporary storage unit 5 are as described in the conventional examples, but are not limited only to such specific structures.

The user alteration operation detection unit 11, upon detecting that the user starts an annotation operation, notifies the group-cluster correspondence table updating and recording unit 12 and the cluster-element correspondence table updating and recording unit 3 of the annotation operation. Upon receiving the notification from the user alteration operation detection unit 11, the group-cluster correspondence table updating and recording unit 12 and the cluster-element correspondence table updating and recording unit 3 respectively read the group-cluster correspondence table and the cluster-element correspondence table obtained as a result of past classification from the temporary storage unit 5, to enable recognition as to which element data and how the element data has been altered by the user.

The user alteration operation detection unit 11 sends the contents of actual alteration to the group-cluster correspondence table updating and recording unit 12, as group-cluster-element correspondence information. For example, on the basis of the group-cluster correspondence table and the cluster-element correspondence table, the data processing apparatus 200 displays relations between groups and element data belonging to the groups by a display unit (not shown in FIG. 6). The user alteration operation detection unit 11 thus allows the user to alter the correspondence relations between the groups and the element data. The user alteration operation detection unit 11 sends the result of the alteration operation by the user, to the group-cluster correspondence table updating and recording unit 12 as the group-cluster-element correspondence information.

The group-cluster correspondence table updating and recording unit 12 updates the group-cluster correspondence table on the basis of the group-cluster-element correspondence information received from the user alteration operation detection unit 11, and records the updated group-cluster correspondence table in the temporary storage unit 5. In detail, the group-cluster correspondence table updating and recording unit 12 extracts a cluster ID corresponding to an element ID detected by the user alteration operation detection unit 11, from the cluster-element correspondence table. The group-cluster correspondence table updating and recording unit 12 then updates a correspondence relation between the extracted cluster ID and a group ID detected by the user alteration operation detection unit 11, in the group-cluster correspondence table. The group-cluster correspondence table updating and recording unit 12 also sends cluster-element correspondence information that is subject to updating, to the cluster-element correspondence table updating and recording unit 3. In detail, in the case where the correspondence relation between the cluster ID and the element ID needs to be changed as a result of the change of the correspondence relation between the group ID and the element ID detected by the user alteration operation detection unit 11, the group-cluster correspondence table updating and recording unit 12 sends the contents of the change to the cluster-element correspondence table updating and recording unit 3 as the cluster-element correspondence information.

The cluster-element correspondence table updating and recording unit 3 updates the cluster-element correspondence table on the basis of the cluster-element correspondence information received from the group-cluster correspondence table updating and recording unit 12, and records the updated cluster-element correspondence table in the temporary storage unit 5.

Thus, in addition to the concepts "element data" and "cluster", the concept "group" is provided as a broader concept than "cluster". Moreover, the cluster-element correspondence table is used to hold automatic classification results, whereas the group-cluster correspondence table is used to hold annotation results. This eases updating of annotation results, while supporting automatic reclassification by element addition.

Embodiment 3

The following describes a data processing apparatus 300 in Embodiment 3 of the present invention, with reference to FIGS. 7 to 10.

Figure 7:
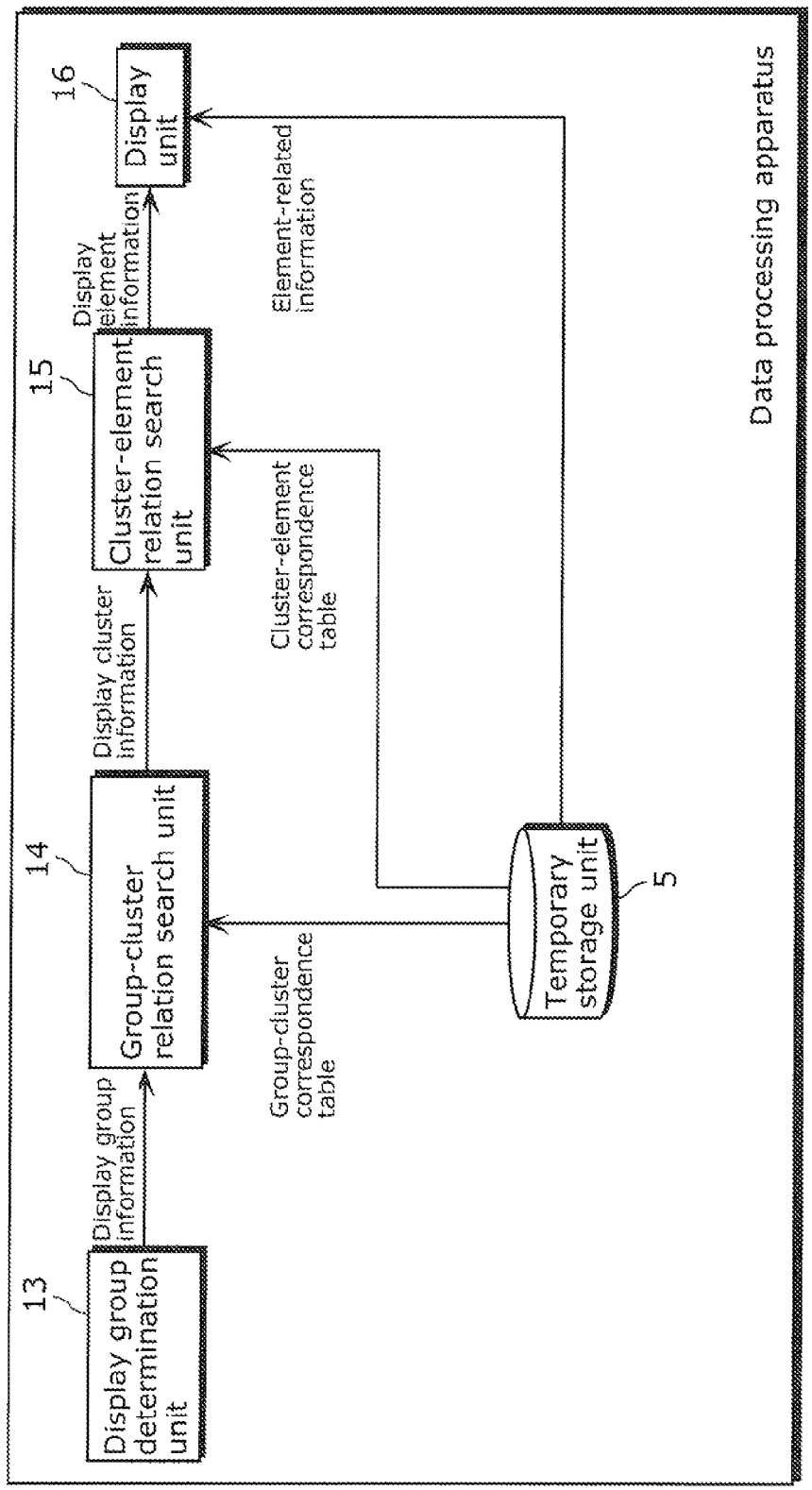
FIG. 7 is a block diagram of a data processing apparatus in Embodiment 3 of the present invention.

FIG. 7 shows the data processing apparatus 300 in Embodiment 3, and particularly shows components necessary when performing data search. The data processing apparatus 300 shown in FIG. 7 includes a display group determination unit 13, a group-cluster relation search unit 14, a cluster-element relation search unit 15, a display unit 16, and the temporary storage unit 5. Structures of the cluster-element relation search unit 15, the display unit 16, and the temporary storage unit 5 are as described in the conventional examples, but are not limited only to such specific structures.

The display group determination unit 13 determines at least one group to be displayed according to a user operation or the like, and sends display group information including a group ID of the group to be displayed, to the group-cluster relation search unit 14. For instance, the data processing apparatus 300 may display a group list by the display unit 16, to allow the user to select a group to be displayed.

The group-cluster relation search unit 14 reads the group-cluster correspondence table obtained as a result of past classification, from the temporary storage unit 5. The group-cluster relation search unit 14 performs a query using the received group ID of the group to be displayed to thereby search the group-cluster correspondence table for a cluster ID of a cluster belonging to the group, and extracts the cluster ID. After the search, the group-cluster relation search unit 14 sends display cluster information including the cluster ID of the cluster to be displayed, to the cluster-element relation search unit 15.

The cluster-element relation search unit 15 reads the cluster-element correspondence table obtained as a result of past classification, from the temporary storage unit 5. The cluster-element relation search unit 15 performs a query using the received cluster ID of the cluster to be displayed to thereby search the cluster-element correspondence table for an element ID of element data belonging to the cluster, and extracts the element ID. After the search, the cluster-element relation search unit 15 sends display element information including the element ID of the element data to be displayed, to the display unit 16.

The display unit 16 displays element-related information of the element data read from the temporary storage unit 5, on the basis of the display element information received from the cluster-element relation search unit 15.

Thus, in addition to the concepts "element data" and "cluster", the concept "group" is provided as a broader concept than "cluster". Moreover, the cluster-element correspondence table is used to hold automatic classification results, whereas the group-cluster correspondence table is used to hold annotation results. This eases updating of annotation results while supporting automatic reclassification by element addition, and also facilitates search of data relating to a desired group.

Figure 8:
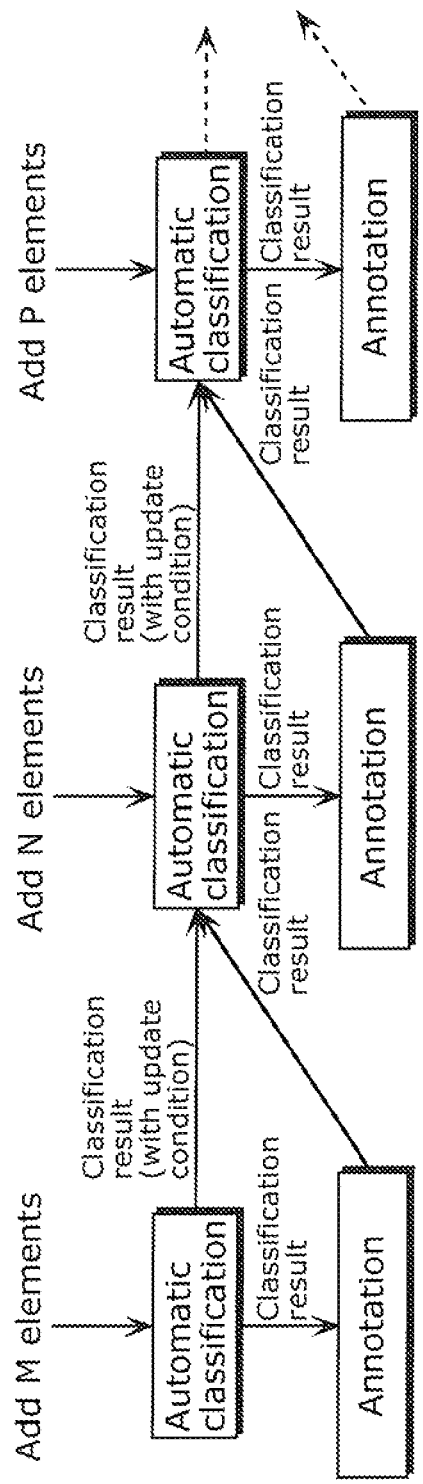
FIG. 8 is a flowchart showing an operation procedure in the data processing apparatuses in Embodiments 1 to 3 of the present invention.

FIG. 8 is a flowchart of a procedure of automatic classification in sequential processing and annotation. Note that FIG. 8 shows a state where processing is performed from left to right in chronological order, as in FIGS. 28, 29, 33, and 35. By performing processing in the above-described manner, a time required for update and search of managed data can be significantly reduced while maintaining consistency between sequential automatic classification and annotation. In detail, the update conditions for existing clusters are set as described in Embodiment 1, and also double management is performed separately for automatic classification results and annotation results as described in Embodiments 1, 2, and 3.

Figure 9:
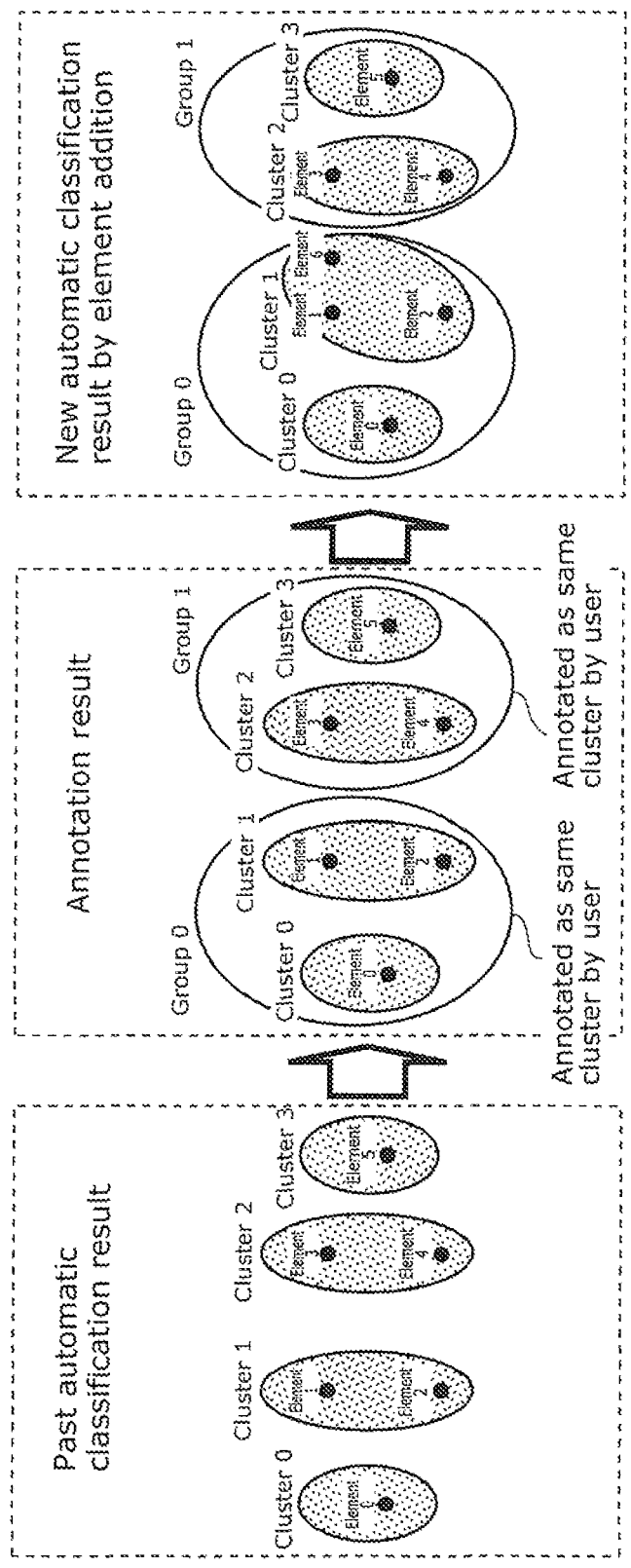
FIG. 9 is a diagram showing an example of a process of classification in the data processing apparatuses in Embodiments 1 to 3 of the present invention.
Figure 10:
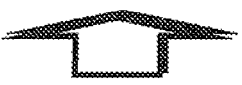
FIG. 10 is a diagram showing an example of classification results in the data processing apparatuses in Embodiments 1 to 3 of the present invention, by the group-cluster correspondence table and the cluster-element correspondence table.
Figure 30:
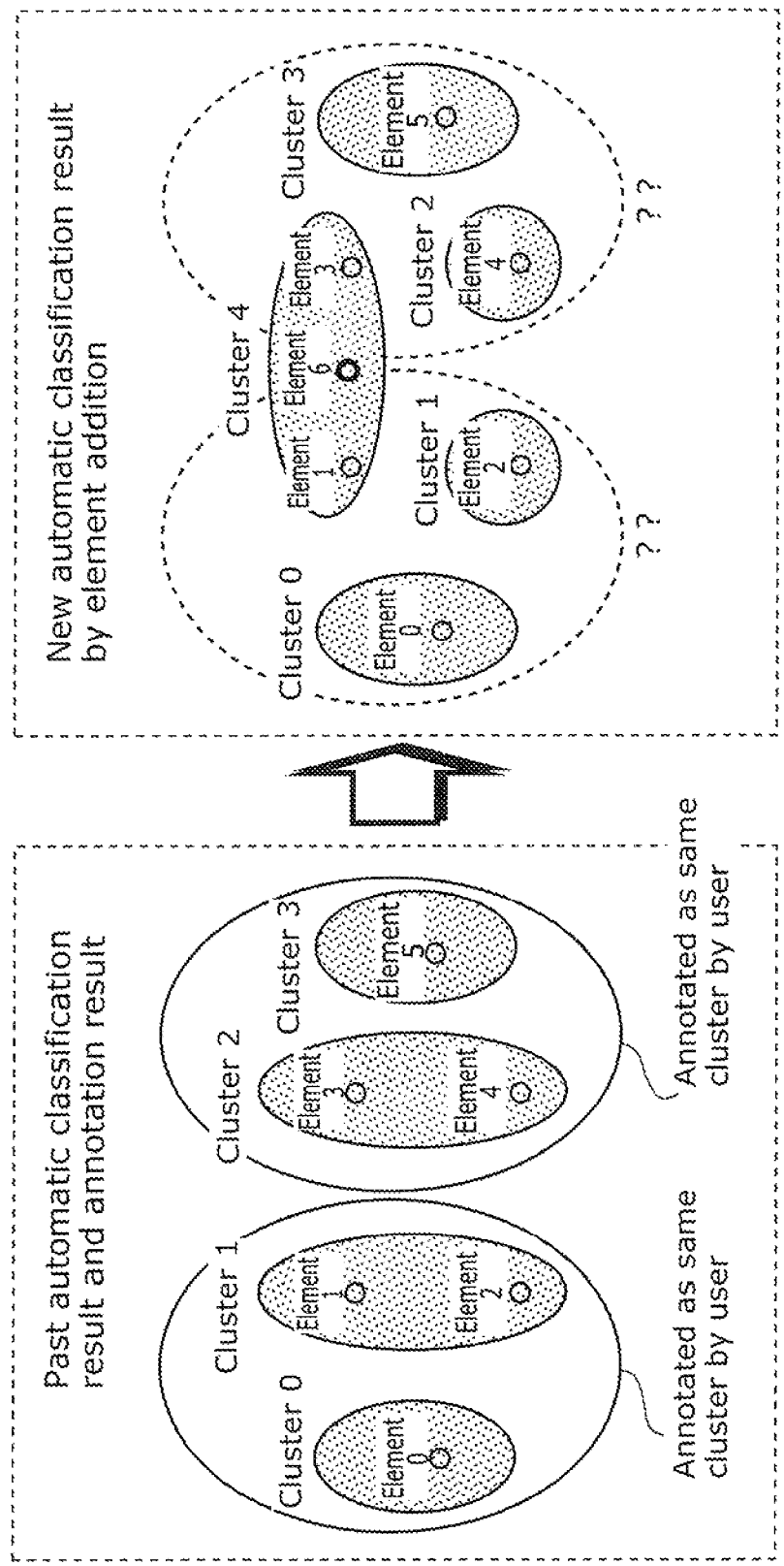
FIG. 30 is a diagram showing an example of classification results in the operation procedure shown in FIG. 29.
Figure 31:
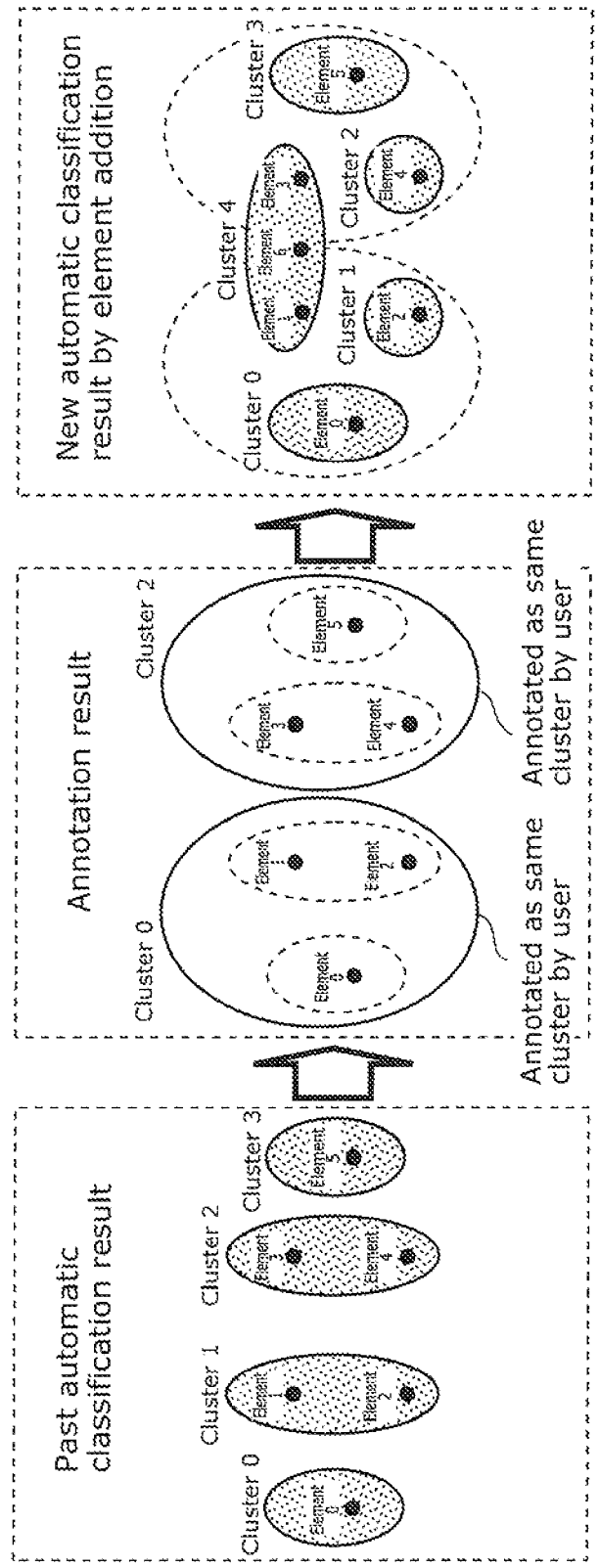
FIG. 31 is a diagram showing an example of results of automatic classification and annotation in the operation procedure shown in FIG. 29.
Figure 32:
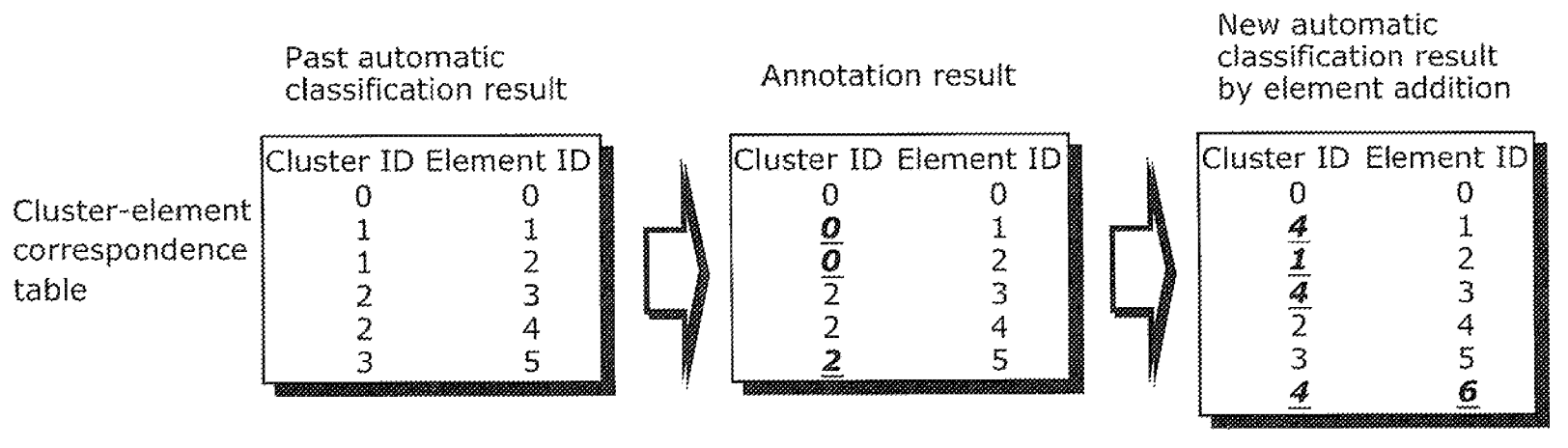
Figure 33:
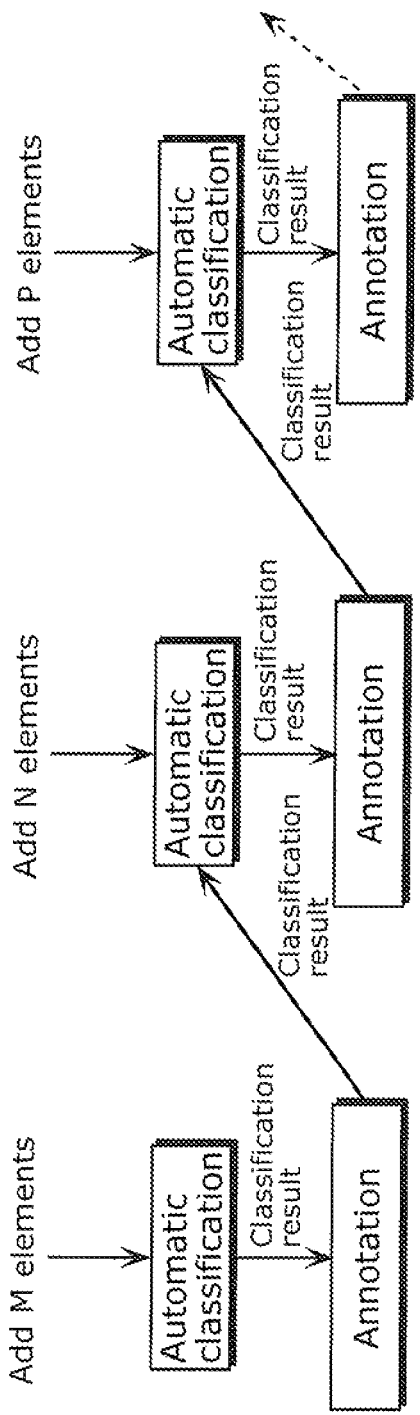
FIG. 33 is a flowchart showing still another example of the operation procedure in the conventional data processing apparatus.
Figure 34:
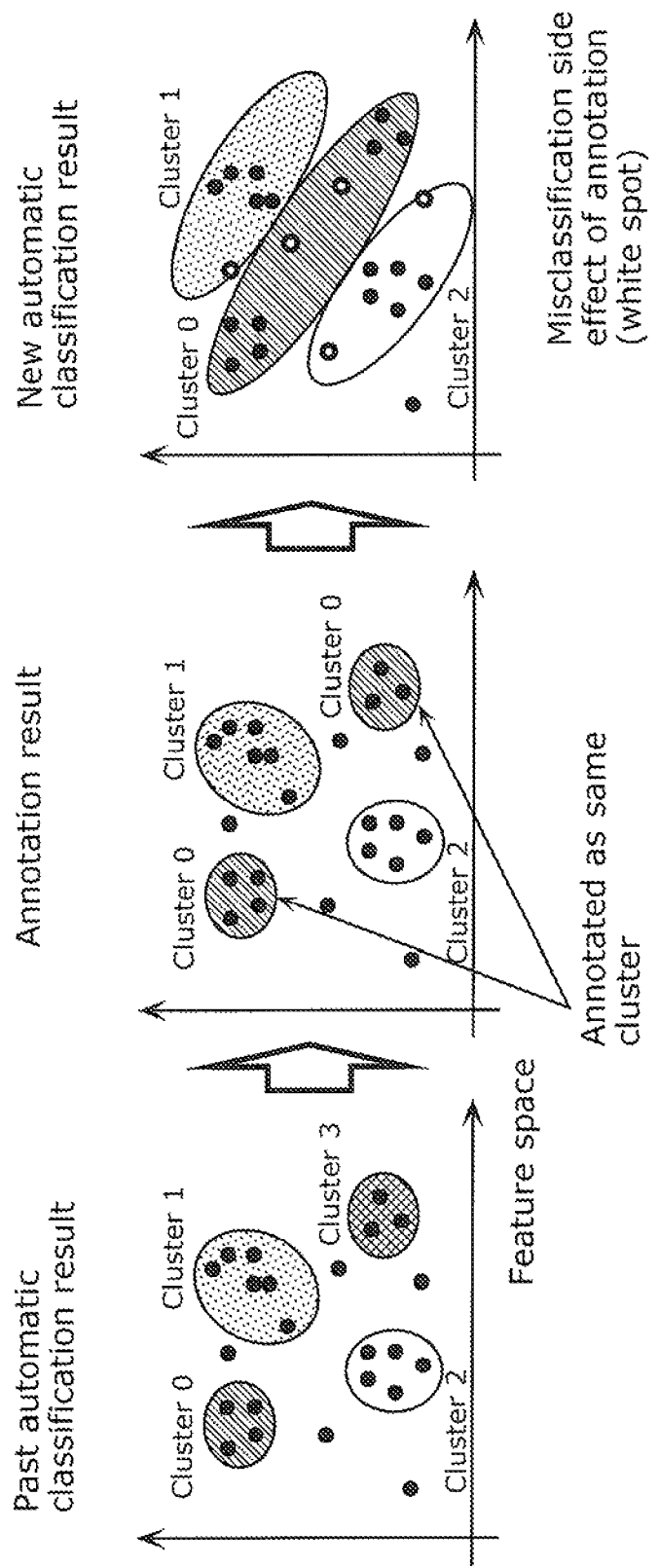
FIG. 34 is a schematic diagram of classification explaining a problem in the operation procedure shown in FIG. 33.
Figure 35:
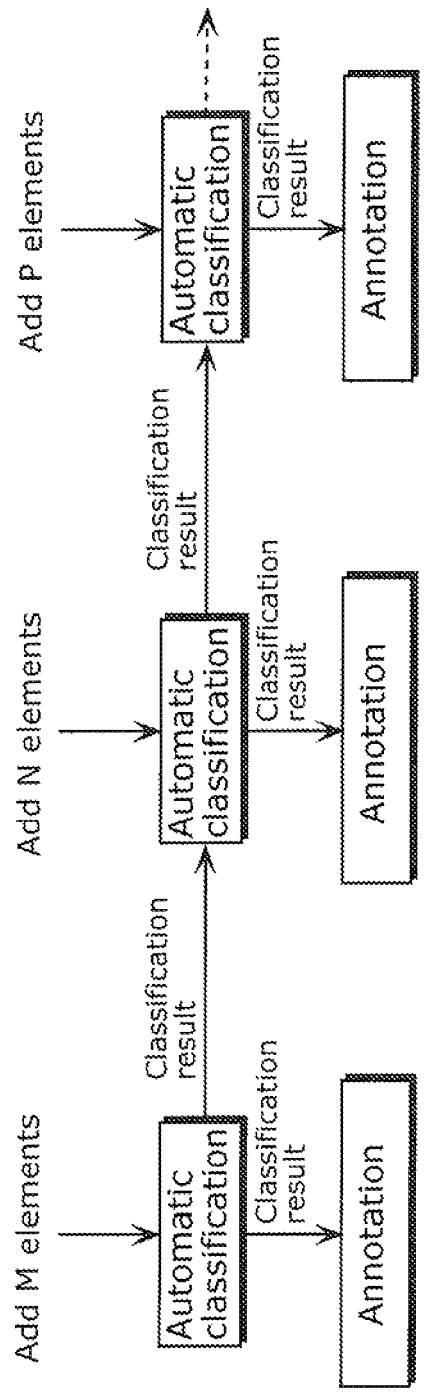
FIG. 35 is a flowchart showing still another example of the operation procedure in the conventional data processing apparatus.

FIG. 9 is a diagram showing how the classification results change as a result of setting the update conditions in automatic classification and newly introducing the concept "group", as compared with the conventional case of FIGS. 30 and 31. FIG. 10 is a diagram showing to what extent the update parts of the group-cluster correspondence table and the cluster-element correspondence table are reduced as a result of newly introducing the concept "group", as compared with the conventional case of FIG. 32.

Automatic classification processing by the data processing apparatus 100 and annotation processing by the data processing apparatus 200 are described in detail below, with reference to FIGS. 9 and 10. Though the above describes the data processing apparatus 100 that executes automatic classification processing and the data processing apparatus 200 that executes annotation processing as separate apparatuses, it should be obvious that these apparatuses may be implemented as the same apparatus.

First, the data processing apparatus 100 receives five pieces of element data (elements 0 to 5), and automatically classifies elements 0 to 5. The result of automatic classification is shown in the left of FIG. 9 and in the left table in FIG. 10. In detail, as shown in the left of FIG. 9 and in the left cluster-element correspondence table in FIG. 10, element 0 belongs to cluster 0, elements 1 and 2 belong to cluster 1, elements 3 and 4 belong to cluster 2, and element 5 belongs to cluster 3. Since annotation has not been executed at this point, there is a one-to-one correspondence between group IDs and cluster IDs, as shown in the left group-cluster correspondence table in FIG. 10.

Following this, the user alteration operation detection unit 11 in the data processing apparatus 200 detects an annotation operation by the user. Suppose the user makes annotation so that elements 0, 1, and 2 belong to group 0 and elements 3, 4, and 5 belong to group 1. The user alteration operation detection unit 11 sends the correspondence relations between the element data and the groups designated by the user, to the group-cluster correspondence table updating and recording unit 12 as group-cluster-element correspondence information.

The group-cluster correspondence table updating and recording unit 12 updates the group-cluster correspondence table read from the temporary storage unit 5, on the basis of the group-cluster-element correspondence information received from the user alteration operation detection unit 11.

In detail, the group-cluster correspondence table updating and recording unit 12 first extracts a cluster ID corresponding to an element ID of element data that is subject to the operation, from the cluster-element correspondence table. In this example, cluster 0 including element 0 and cluster 1 including elements 1 and 2 are extracted. The group-cluster correspondence table updating and recording unit 12 then updates the correspondence relations in the group-cluster correspondence table so that extracted clusters 0 and 1 belong to the same group 0. Likewise, the group-cluster correspondence table updating and recording unit 12 updates the correspondence relations in the group-cluster correspondence table so that cluster 2 including elements 3 and 4 and cluster 3 including element 5 belong to the same group 1. As a result, the middle group-cluster correspondence table in FIG. 10 is obtained.

The group-cluster correspondence table updating and recording unit 12 then determines whether or not the correspondence relations between the cluster IDs and the element IDs need to be changed as a result of the alteration operation by the user. In this example, there is no need to change the correspondence relations between the cluster IDs and the element IDs. In the case where the correspondence relations between the cluster IDs and the element IDs need to be changed, on the other hand, the group-cluster correspondence table updating and recording unit 12 sends cluster-element correspondence information showing the new correspondence relations, to the cluster-element correspondence table updating and recording unit 3.

The cluster-element correspondence table updating and recording unit 3 updates the cluster-element correspondence table read from the temporary storage unit 5, only when receiving the cluster-element correspondence information from the group-cluster correspondence table updating and recording unit 12 (that is, only when the correspondence relations between the cluster IDs and the element IDs need to be changed).

Next, when new element 6 is inputted to the data processing apparatus 100, the feature extraction unit 1 extracts a feature value of element 6, and the belonging cluster determination unit 7 determines a belonging cluster of element 6. In this example, element 6 belongs to cluster 1. The cluster-element ID management unit 8 sends cluster-element correspondence information showing the correspondence relation between cluster 1 and element 6 to the cluster-element correspondence table updating and recording unit 3, on the basis of the determination result of the belonging cluster determination unit 7.

The classification boundary condition updating and recording unit 10 updates the classification boundary condition of cluster 1, as a result that element 6 belongs to cluster 1. The updated classification boundary condition includes newly added element 6, and also satisfies the constraints. That is, the classification boundary condition is updated so that element 6 is included in cluster 1, while prohibiting such a situation where any of elements 0, 3, 4, and 5 belonging to other clusters 0, 2, and 3 before the update belongs to cluster 1, or any of elements 1 and 2 belonging to cluster 1 before the update no longer belongs to cluster 1.

Meanwhile, the cluster-element correspondence table updating and recording unit 3 adds the correspondence relation between cluster 1 and element 6 to the cluster-element correspondence table, on the basis of the cluster-element correspondence information received from the cluster-element ID management unit 8. As a result, the right cluster-element correspondence table in FIG. 10 is obtained. In the case where newly added element 6 does not belong to any existing cluster, the cluster-element correspondence table updating and recording unit 3 sends additional cluster information to the group-cluster correspondence table addition unit 4, and the group-cluster correspondence table addition unit 4 updates the group-cluster correspondence table. In this example, however, there is no need to update the group-cluster correspondence table.

Thus, in the case of annotation, only the group ID change in response to the user operation needs to be made in the group-cluster correspondence table, and there is no need to rewrite the cluster-element correspondence table. Moreover, it is unnecessary to rewrite the ID of the belonging cluster for all element data as has been conventionally done, so that a fast updating operation can be expected. Furthermore, in the case of addition of element data, since the update conditions are defined, it is only necessary to add the information about the newly added element data to the cluster-element correspondence table, with there being no need to update the group-cluster correspondence table.

Note that, in the case where the additional element is not added to the existing cluster as in this example but a new cluster is generated, the group-cluster correspondence table needs to be updated. However, this can be done merely by adding one row for an ID of the cluster and a new group ID corresponding to the cluster, and there is still no need to rewrite the ID of the belonging cluster for all element data as has been conventionally done. Therefore, a fast updating operation can be expected. Besides, since search is performed in two levels of correspondence relations between groups and clusters and between clusters and element data, a higher search speed is likely to be attained than the conventional examples where search is performed in one level of correspondence relations.

Embodiment 4

Figure 11:
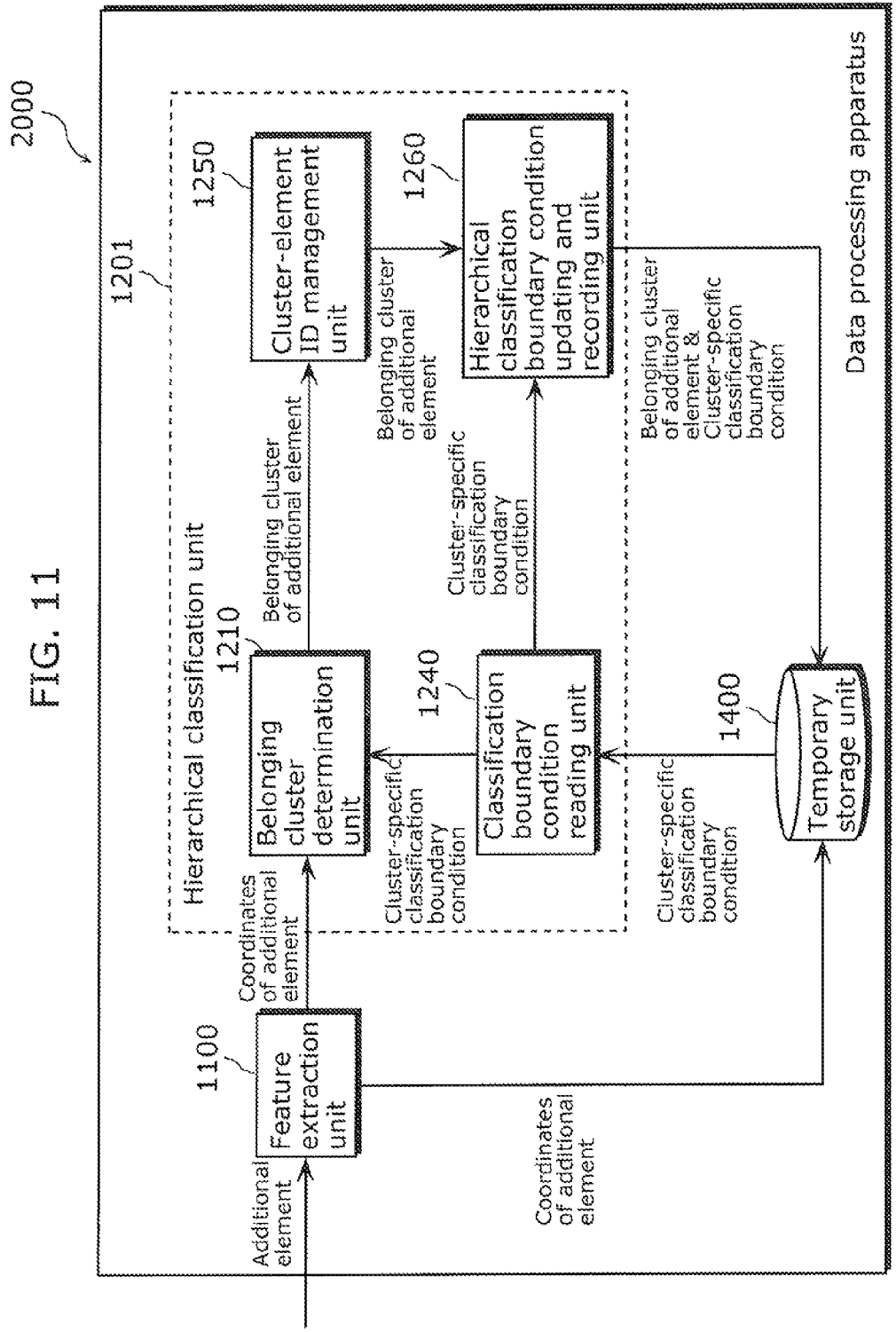
FIG. 11 is a block diagram of a conventional data processing apparatus of sequential hierarchical classification.

FIG. 11 shows a data processing apparatus 2000 as a comparative example of Embodiment 4, and particularly shows components necessary when executing classification processing in the case of combining the data management method in Embodiment 3 and a hierarchical tree classification method.

The data processing apparatus 2000 shown in FIG. 11 includes the feature extraction unit 1100, the belonging cluster determination unit 1210, a cluster-element ID management unit 1250, the classification boundary condition reading unit 1240, a hierarchical classification boundary condition updating and recording unit 1260, a hierarchical classification unit 1201, and the temporary storage unit 1400. Structures of the feature extraction unit 1100, the belonging cluster determination unit 1210, the classification boundary condition reading unit 1240, and the temporary storage unit 1400 are as described in the conventional examples, but are not limited only to such specific structures. The cluster-element ID management unit 1250 has a structure similar to that in Embodiment 1.

The hierarchical classification unit 1201 reads a classification boundary condition of each cluster obtained as a result of past classification and coordinate information of all element data on a feature space from the temporary storage unit 1400, when a feature value of an additional element is computed by the feature extraction unit 1100. The hierarchical classification unit 1201 determines which cluster the additional element belongs to. The hierarchical classification unit 1201 then modifies the past classification results in response to the addition of the new element data, and records the modified classification boundary condition of the cluster and coordinates of the additional element in the temporary storage unit 1400. An example of a detailed structure and processing of the hierarchical classification unit 1201 is described below.

Figure 26:
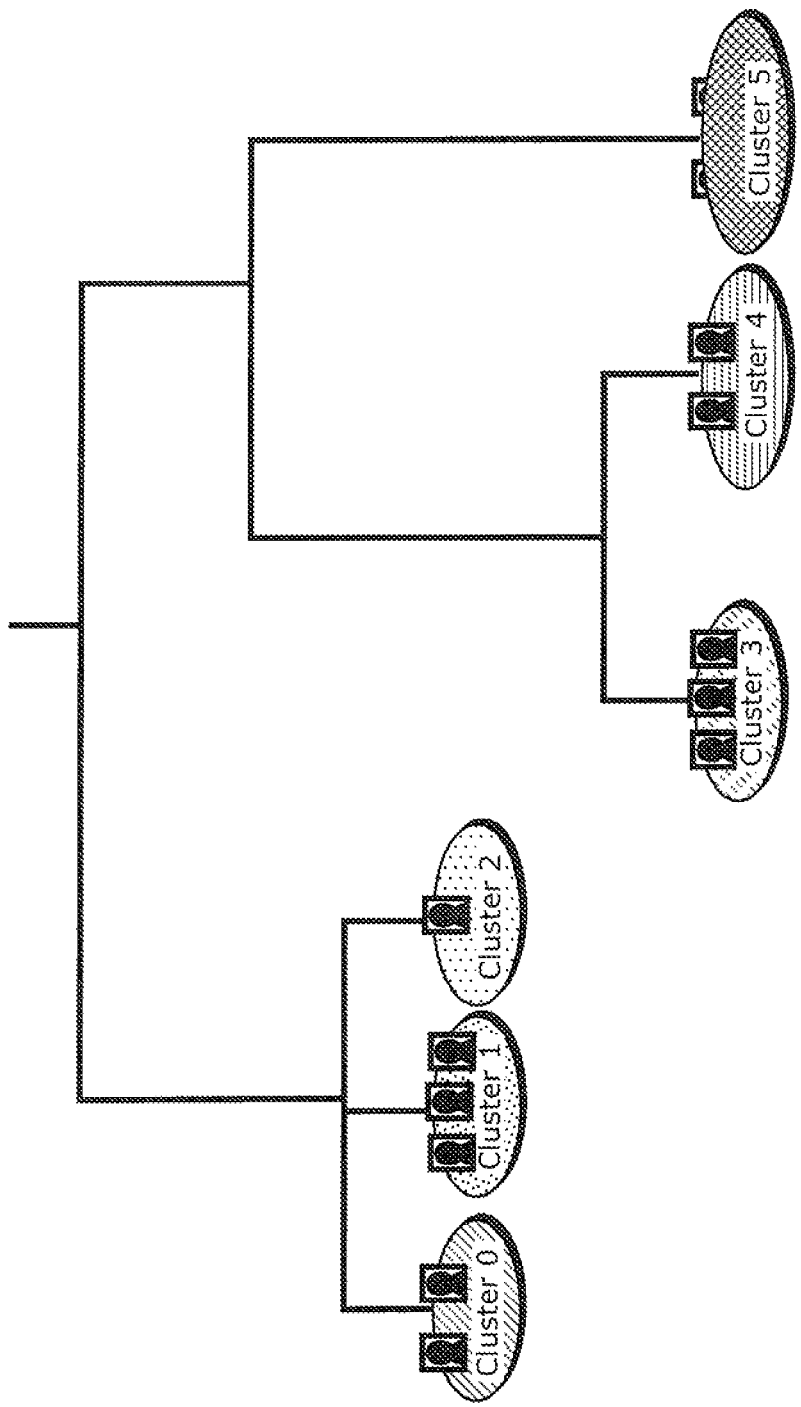
FIG. 26 is a schematic diagram of hierarchical classification of the conventional data processing apparatus.
Figure 27:
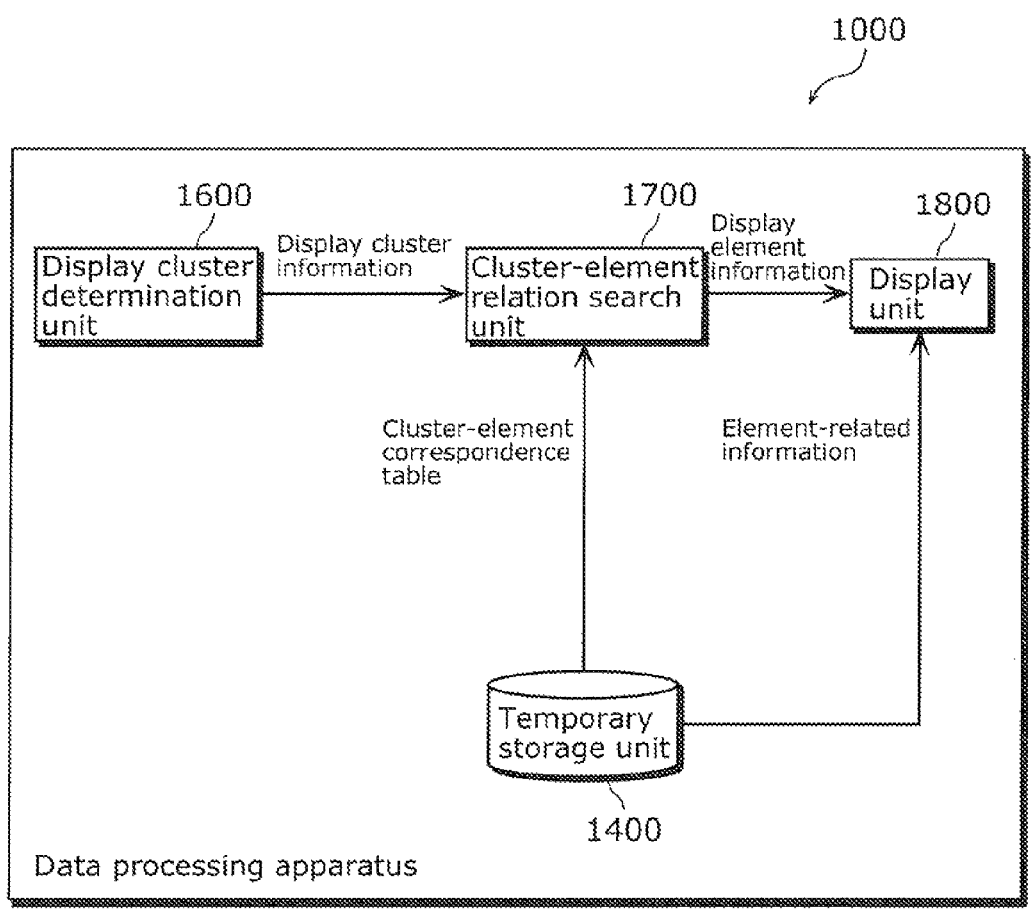
FIG. 27 is a block diagram of the conventional data processing apparatus in data search.
Figure 28:
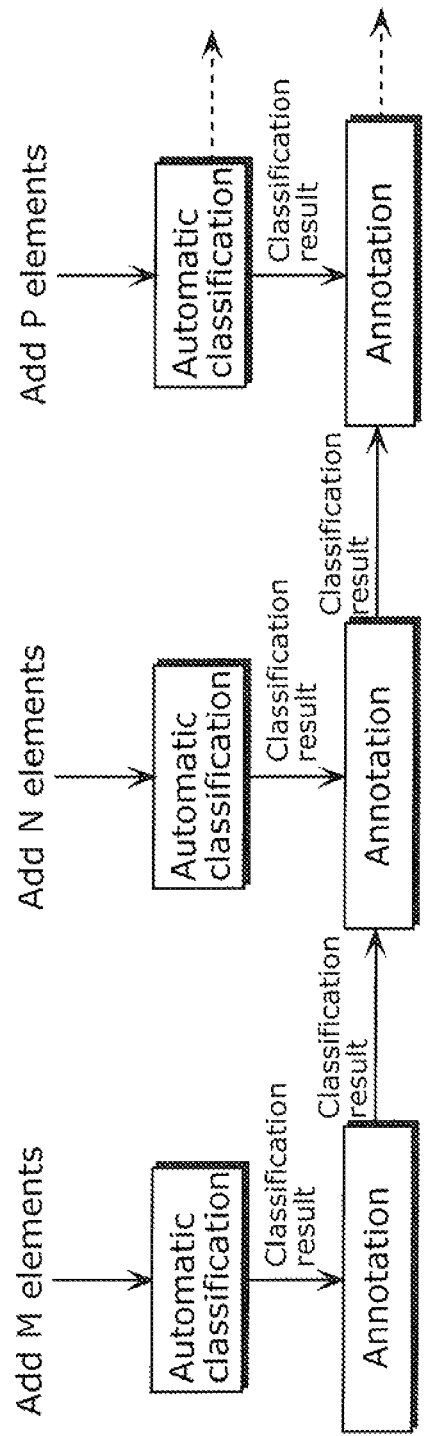
FIG. 28 is a flowchart showing an example of an operation procedure in the conventional data processing apparatus.
Figure 29:
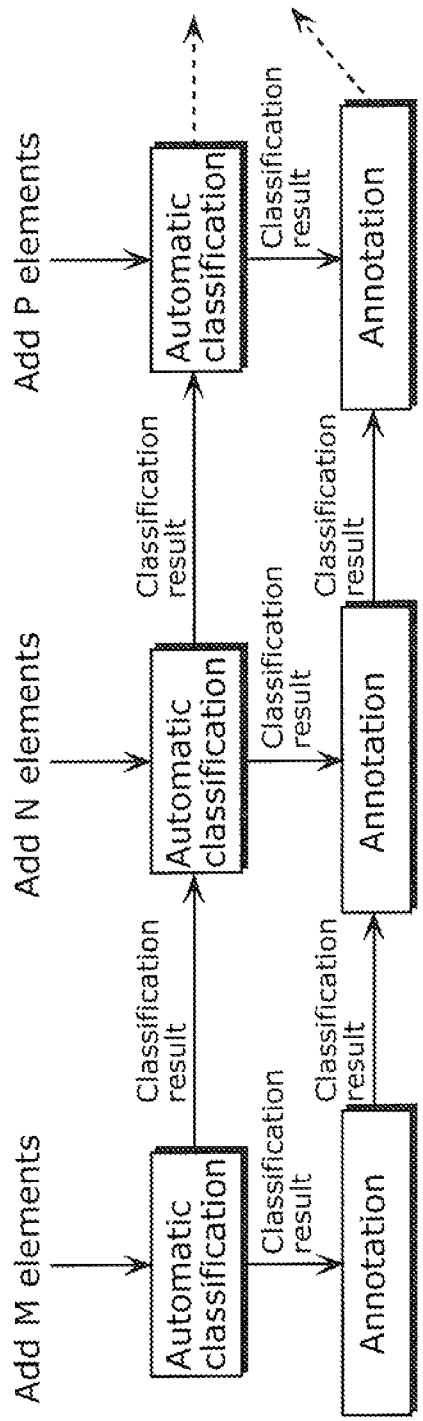
FIG. 29 is a flowchart showing another example of the operation procedure in the conventional data processing apparatus.

The belonging cluster determination unit 1210 employs the following specific method, when applied to hierarchical classification. First, for the past hierarchical automatic classification results shown in FIG. 26, the belonging cluster determination unit 1210 determines which branch the input additional element is closer to, on the basis of a hierarchical classification boundary condition at each node. The belonging cluster determination unit 1210 performs this matching sequentially from a highest hierarchical level to a lowest hierarchical level. In this way, the belonging cluster determination unit 1210 eventually determines a closest cluster to which the additional element belongs. The hierarchical classification boundary condition used here is read from the temporary storage unit 1400 through the classification boundary condition reading unit 1240. The belonging cluster determination unit 1210 sends information of the determined belonging cluster to the hierarchical classification boundary condition updating and recording unit 1260, and the hierarchical classification boundary condition updating and recording unit 1260 records the information in the temporary storage unit 1400.

As a specific example of the hierarchical classification boundary condition, there is a technique of preparing, at each node, a probability density function distributed on the feature space for each class in consideration of its lower components. In this case, determination is sequentially performed for each hierarchical level, so that the element data belongs to a class of a highest probability density obtained as a result of input of the coordinates of the element data to the probability density function. Alternatively, distance determination may be performed instead of using the probability density. For instance, at each node, a distance between the element data and each class is computed upon input of the coordinates of the element data to a distance computation expression, in consideration of the lower components of the class. In this case, any distance computation method such as Euclidean distance, Mahalanobis distance, Manhattan distance, and the like may be used.

The hierarchical classification boundary condition updating and recording unit 1260 receives the coordinates of the additional element on the feature space and the belonging cluster of the additional element from the cluster-element ID management unit 1250, and the past classification boundary conditions from the classification boundary condition reading unit 1240. The hierarchical classification boundary condition updating and recording unit 1260 updates the probability density function or distance computation expression of the class of each hierarchical level to which the additional element belongs. The hierarchical classification boundary condition updating and recording unit 1260 then records the updated classification boundary conditions in the temporary storage unit 1400.

Figure 12:
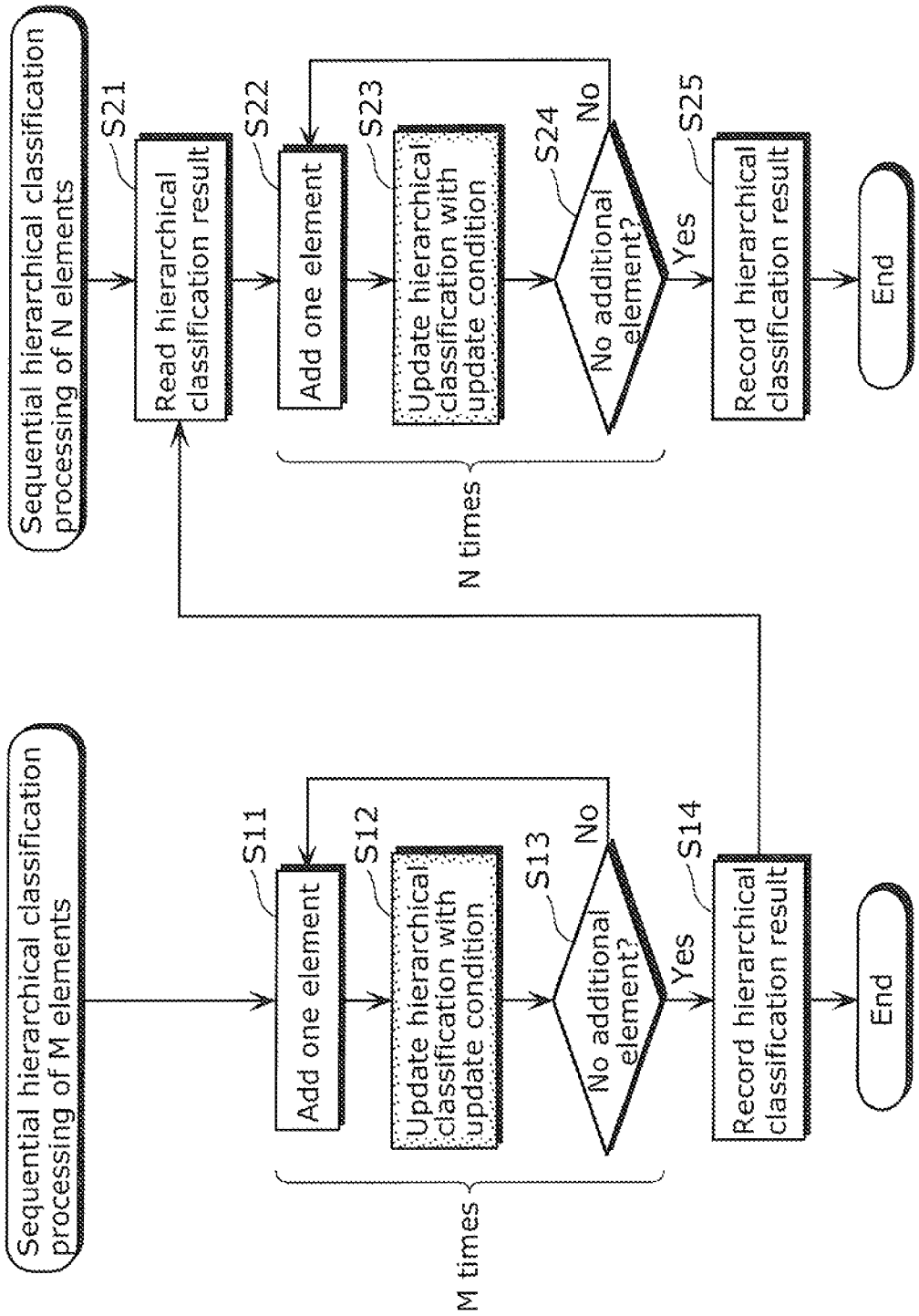
FIG. 12 is a flowchart of processing of the conventional data processing apparatus of sequential hierarchical classification.

FIG. 12 is a flowchart showing an operation of the data processing apparatus 2000 shown in FIG. 11, upon data addition. In detail, classification processing for M pieces of element data (first element data set) is executed (Steps S11 to S14), and then classification processing for N pieces of element data (second element data set) is executed (Steps S21 to S25).

First, in sequential hierarchical classification of the M pieces of element data, element data is sequentially added and automatically classified (Step S11). Each time the element data is added, the classification boundary condition is updated (Step S12). After classifying all additional elements (Step S13: Yes), information of the belonging clusters of the additional elements and information of the cluster-specific classification boundary conditions obtained as a result of hierarchical classification are recorded in the temporary storage unit 1400 (Step S14). Following this, when the N pieces of element data are added, the hierarchical classification results stored in the temporary storage unit 1400 are read (Step S21), and automatic classification processing of the N pieces of element data is performed (Steps S22 to S24). After classifying all additional elements (Step S24: Yes), information of the belonging clusters of the additional elements and information of the cluster-specific classification boundary conditions obtained as a result of hierarchical classification are recorded in the temporary storage unit 1400 (Step S25). This operation is subsequently repeated.

According to this structure, even when data is sequentially added, by merely performing classification processing for the additional data, the automatic classification results of the additional data can be reflected while holding the past automatic classification results. Moreover, the use of the hierarchical structure makes it unnecessary to perform matching with all clusters in the past classification results each time, as matching needs to be performed only the number of hierarchical levels. This contributes to a smaller processing load in classification. Furthermore, it is only necessary to update the classification boundary condition of each hierarchical level of the class to which the newly added element data belongs, which contributes to a smaller processing load in updating.

However, there is a problem that automatic classification performance somewhat degrades when the constraints (update conditions) of classification as described in Embodiments 1 to 3 are set.

FIG. 13 is a diagram comparing two automatic classification results in the case where the constraints (update conditions) of classification are set and in the case where the constraints are not set, when implementing a face classification algorithm using the same hierarchical classification technique (distance computation method) and face feature value extraction method. Two photograph data sets (two family photograph sets each of which includes 300 face images) are prepared as evaluation data.

The first result (the upper row in FIG. 13) shows an accuracy rate when automatic classification is performed in two separate operations where 100 face images are added first and then 200 face images are added as in the flowchart shown in FIG. 12, while setting the update conditions during hierarchical classification. The second result (the lower row in FIG. 13) shows an accuracy rate when automatic classification is performed on 300 face images in one operation, without setting the update conditions. Note that the accuracy rate is a value obtained by dividing the number of accurate face images by the number of all face images. Here, the case where each piece of element data (face image in this example) representing the same person is classified in a cluster of the same person is set as accurate, and the case other than this is set as inaccurate.

As can be understood from FIG. 13, the accuracy rate is about 4% to 5% lower in the case where the update conditions are set, than in the case where the update conditions are not set. In this experiment, the accuracy rate is computed after the second data set (200 face images) is added, in the process of adding 100 face images first and then adding 200 face images. Accordingly, further performance degradation is expected to occur when data set addition is performed a plurality of times.

For example, the accuracy rate tends to decrease more in the case where a process of adding 100 face images is performed 10 times, than in the case where 1000 face images are automatically classified in one operation. Note, however, that the number of pieces of element data to be automatically classified increases more and more in the latter case, which causes an increase in computation amount. In other words, the latter case has a different problem, i.e., an increase in computation amount, because sequential processing is not performed.

In view of the above, Embodiment 4 described below realizes data processing for maintaining the same level of automatic classification performance as when all past element data are reclassified each time, while achieving both automatic classification of sequential processing type and manual classification by the user.

The following describes a data processing apparatus 400 in Embodiment 4 of the present invention, with reference to FIGS. 14 to 20. Note that "unit" in Embodiment 4 is a small unit of automatic classification result, which is a narrower concept than "cluster" in Embodiments 1 to 3.

Figure 14:
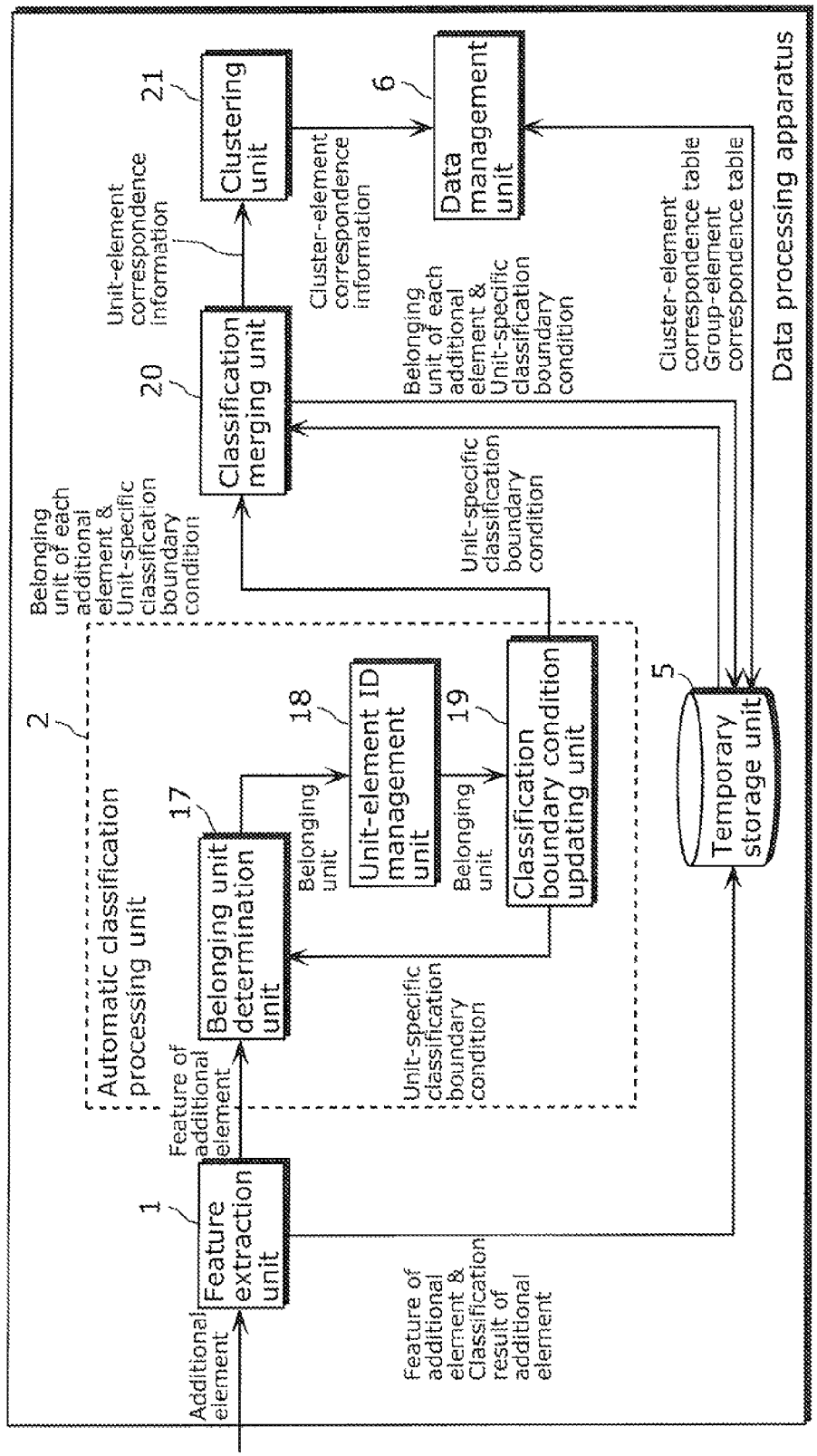
FIG. 14 is a block diagram of a data processing apparatus in Embodiment 4 of the present invention.

FIG. 14 shows the data processing apparatus 400 in Embodiment 4, and particularly shows components necessary when performing automatic classification. The data processing apparatus 400 shown in FIG. 14 includes the feature extraction unit 1, the automatic classification processing unit 2, a belonging unit determination unit 17, a unit-element ID management unit 18, a classification boundary condition updating unit 19, a classification merging unit 20, a clustering unit 21, the data management unit 6, and the temporary storage unit 5. Structures of the feature extraction unit 1 and the temporary storage unit 5 are as described in the conventional examples, but are not limited only to such specific structures. The data management unit 6, the belonging unit determination unit 17, and the unit-element ID management unit 18 have similar structures to the data management unit 6, the belonging cluster determination unit 7, and the cluster-element ID management unit 8 in Embodiment 1 respectively, and only differ in that "cluster" is replaced with "unit".

In the case where first and second element data sets each of which includes two or more pieces of element data are inputted to the data processing apparatus 400 of the above structure, the automatic classification processing unit 2 executes belonging cluster determination processing and classification boundary condition updating processing, independently on each of the first and second element data sets.

The classification merging unit 20 merges classification boundary conditions updated in the processing performed on each of the first and second element data sets, after all element data have been processed. The clustering unit 21 generates a cluster including a plurality of units, and determines a classification boundary condition that defines a boundary of the cluster.

Figure 15:
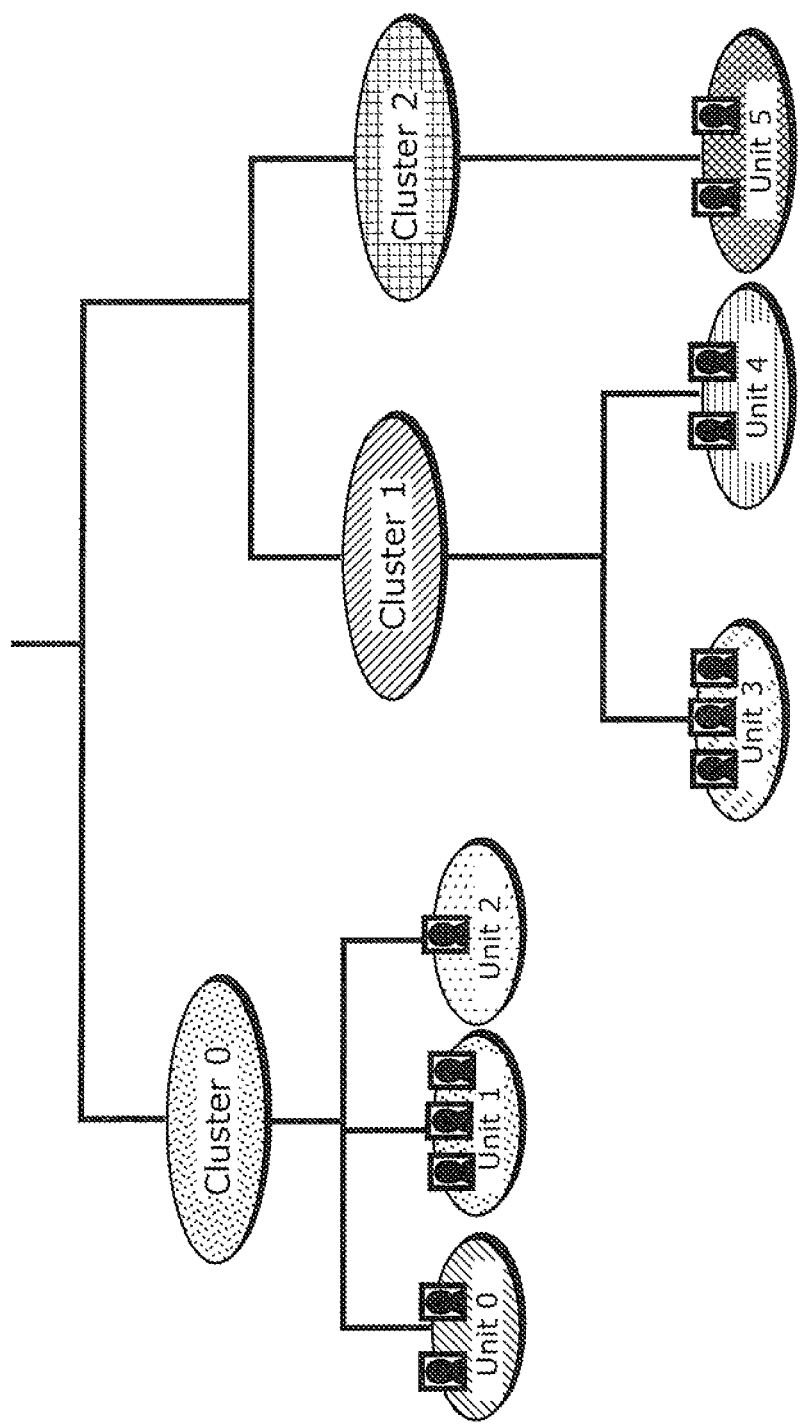
FIG. 15 is a schematic diagram of hierarchical classification of the data processing apparatus in Embodiment 4 of the present invention.

FIG. 15 shows relations between units and clusters in the hierarchical classification technique. The term "classification" here denotes classifying into relatively small classes ("unit"). Meanwhile, the term "clustering" denotes producing large classification results ("cluster") from such small-classification classes ("unit"). The classification merging unit 20 sets a range smaller than an arbitrary distance scale a, as a small class ("unit"). The clustering unit 21 sets a range smaller than a distance scale b that is larger than the distance scale a, as a large class ("cluster").

The distance scale a is fixed, whereas the distance scale b is variable, for example, by the user. This allows the automatic classification results including the past element data to be continuously maintained in small classes ("unit"). Moreover, it is possible to determine, each time automatic classification processing is executed, by which scale the classification is executed. Furthermore, large classification can be simply performed by using the past small-classification results, without reclassifying all element data each time. Hence the computation amount when performing additional classification processing can be reduced.

The automatic classification processing unit 2 in Embodiment 4 has a structure that supports sequential processing. Whenever a feature value of an additional element is computed, the automatic classification processing unit 2 sequentially determines which cluster the additional element belongs to, on the basis of closed classification results of a plurality of pieces of element data that have been added previously. Once all additional elements have been inputted and their classification results have been obtained, the automatic classification processing unit 2 sends the classification results to the classification merging unit 20. A flow of internal processing of the automatic classification processing unit 2 is described below.

The belonging unit determination unit 17 receives coordinates of an additional element on the feature space from the feature extraction unit 1, and a classification boundary condition of each unit from the classification boundary condition updating unit 19. The belonging unit determination unit 17 determines a closest unit as a belonging unit of the additional element. Here, the classification boundary conditions received from the classification boundary condition updating unit 19 are the most recent unit-specific classification boundary conditions closed within the plurality of added pieces of element data. Note that, since closed classification is performed within a plurality of pieces of element data added in one operation, there is no classification boundary condition when classifying element data that is added first. Each time element data is added, the classification boundary condition updating unit 19 updates the classification boundary conditions, and the belonging unit determination unit 17 reads the classification boundary conditions and determines a belonging unit of the element data in sequence. The classification boundary condition updating unit 19 then updates the classification boundary conditions again, according to the result of the determination. This processing is repeated.

When there is no more additional element, the classification boundary condition updating unit 19 sends the latest classification boundary conditions to the classification merging unit 20. Note that, in the case where the element data is far from any unit by more than a predetermined distance when determining the belonging unit, a new unit is generated as the belonging unit.

The unit-element ID management unit 18 determines a unit ID, on the basis of information of the unit to which the additional element belongs. For example, when the additional element is determined to belong to a new independent unit, the unit-element ID management unit 18 numbers a new unit ID. When the additional element is determined to belong to an existing unit, the unit-element ID management unit 18 assigns a unit ID of the existing unit. The unit-element ID management unit 18 sends information of the determined unit ID to the classification boundary condition updating unit 19.

The classification boundary condition updating unit 19 updates the most recent unit-specific classification boundary conditions closed within the plurality of added pieces of element data. In detail, the classification boundary condition updating unit 19 modifies only a classification boundary condition relating to a unit to which the additional element belongs. For example, suppose there is a boundary condition between units A and B, but there is no boundary condition between units A and C because clusters units A and C are not adjacent to each other. In this case, when additional element a is added to unit A, the classification boundary condition updating unit 19 modifies only the classification boundary condition between units A and B. A classification boundary condition setting method depends on the type of automatic classification technique mentioned earlier. The classification boundary condition updating unit 19 records the updated unit-specific classification boundary condition and the belonging unit of the additional element, in the temporary storage unit 5.

Note that, in the automatic classification processing unit 2 in Embodiment 4, the constraints (update conditions) are placed so as to prevent splitting of an existing unit and merging of existing units when element data is newly added to a unit obtained as a result of past classification, as in Embodiment 1. In detail, these constraints are placed in the classification boundary condition updating unit 19. Meanwhile, the automatic classification processing unit 2 is permitted to generate a new unit by the additional element itself, and add the additional element to an existing unit.

Once all additional elements have been inputted and their classification results have been obtained, the classification merging unit 20 merges the unit-specific classification boundary conditions for the added pieces of element data, with the unit-specific classification boundary conditions of the past classification results read from the temporary storage unit 5, thereby computing new unit-specific classification boundary conditions. The classification merging unit records the computed unit-specific classification boundary conditions in the temporary storage unit 5. The classification merging unit 20 also sends information about the added element data and the belonging units of the element data, to the clustering unit 21.

The clustering unit 21 performs clustering, on the basis of the latest unit-element correspondence information received from the classification merging unit 20. Clustering mentioned here is producing the results of large classification on the basis of small-classification classes ("unit"), as noted above.

Figure 16:
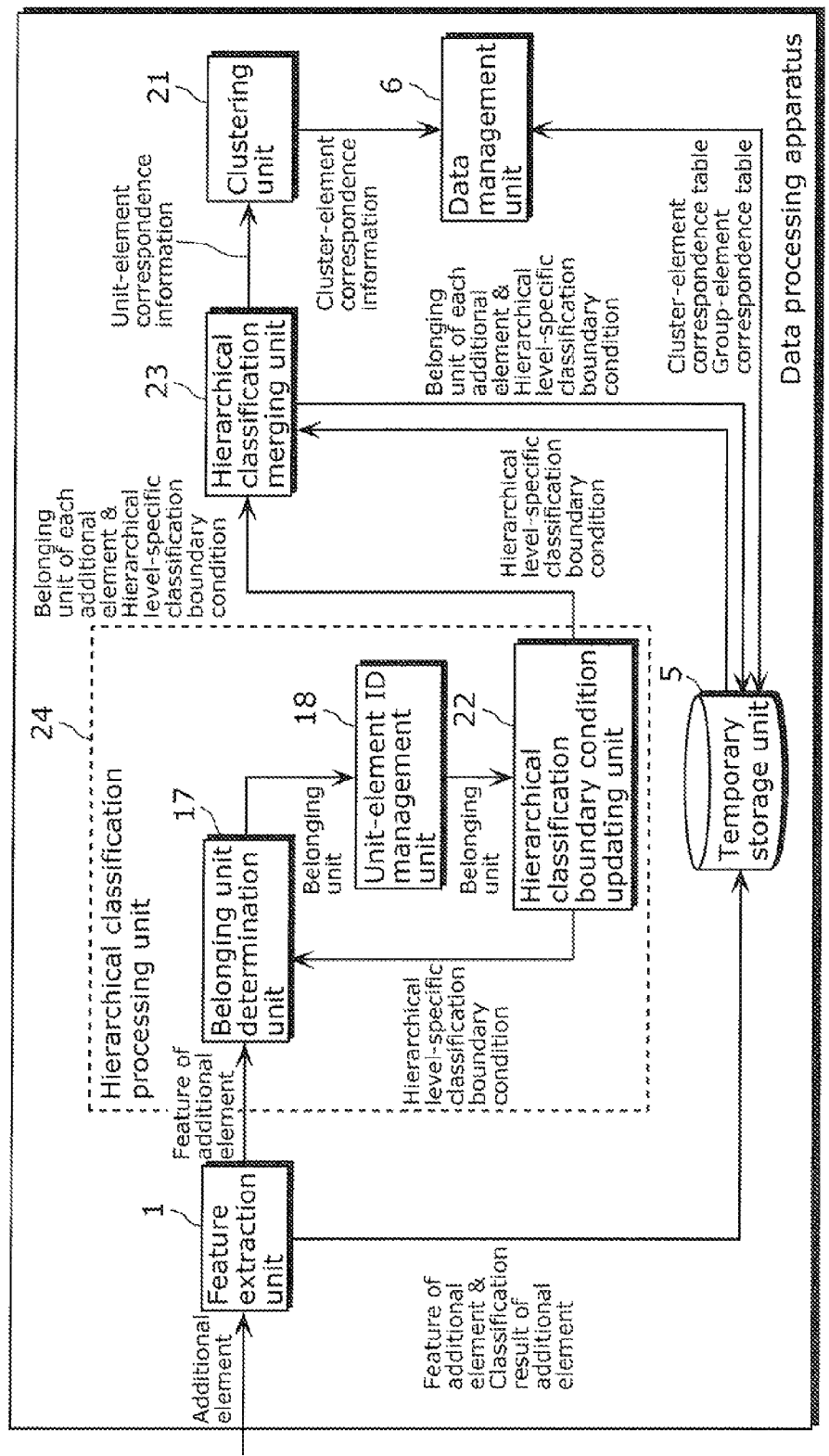
FIG. 16 is a detailed block diagram of the data processing apparatus in Embodiment 4 of the present invention.

FIG. 16 shows a structure of a data processing apparatus 500 in which, among the components of the data processing apparatus 400 in Embodiment 4, the automatic classification processing unit 2 is replaced with a hierarchical classification processing unit 24, the classification boundary condition updating unit 19 is replaced with a hierarchical classification boundary condition updating unit 22, and the classification merging unit 20 is replaced with a hierarchical classification merging unit 23. Note that the components other than the hierarchical classification boundary condition updating unit 22 and the hierarchical classification merging unit 23 have similar structures to those shown in FIG. 14.

The data processing apparatus 500 shown in FIG. 16 hierarchically manages classification boundary conditions. In detail, as shown in FIG. 15, a classification boundary condition defining a boundary of each of units 0, 1, and 2 is set as a lower classification boundary condition, and a classification boundary condition defining a boundary of cluster 0 that includes units 0, 1, and 2 is set as a higher classification boundary condition. The same applies to relations between classification boundary conditions of units 3, 4, and 5 and clusters 1 and 2.

Upon determining a belonging unit of an additional element, the belonging unit determination unit 17 in the hierarchical classification processing unit 24 sequentially performs comparison from a higher classification boundary condition. For example, the belonging unit determination unit 17 first determines whether or not the additional element belongs to cluster 0, by comparing a feature value of the additional element with the classification boundary condition (higher classification boundary condition) of cluster 0. In the case of determining that the additional element belongs to cluster 0, the belonging unit determination unit 17 determines which of units 0, 1, and 2 the additional element belongs to, by comparing the feature value of the additional element with the classification boundary condition (lower classification boundary condition) of each of units 0, 1, and 2.

The hierarchical classification boundary condition updating unit 22 in the hierarchical classification processing unit 24 updates only the classification boundary conditions of the unit and the cluster to which the additional element belongs. For instance, in the case where the additional element is determined to belong to unit 1 in the above example, the hierarchical classification boundary condition updating unit 22 updates only the classification boundary condition of cluster 0 and the classification boundary condition of unit 1.

According to this structure, the number of times the feature value of the additional element is compared with a classification boundary condition can be reduced. In addition, the number of times a classification boundary condition is updated can be reduced.

Figure 17:
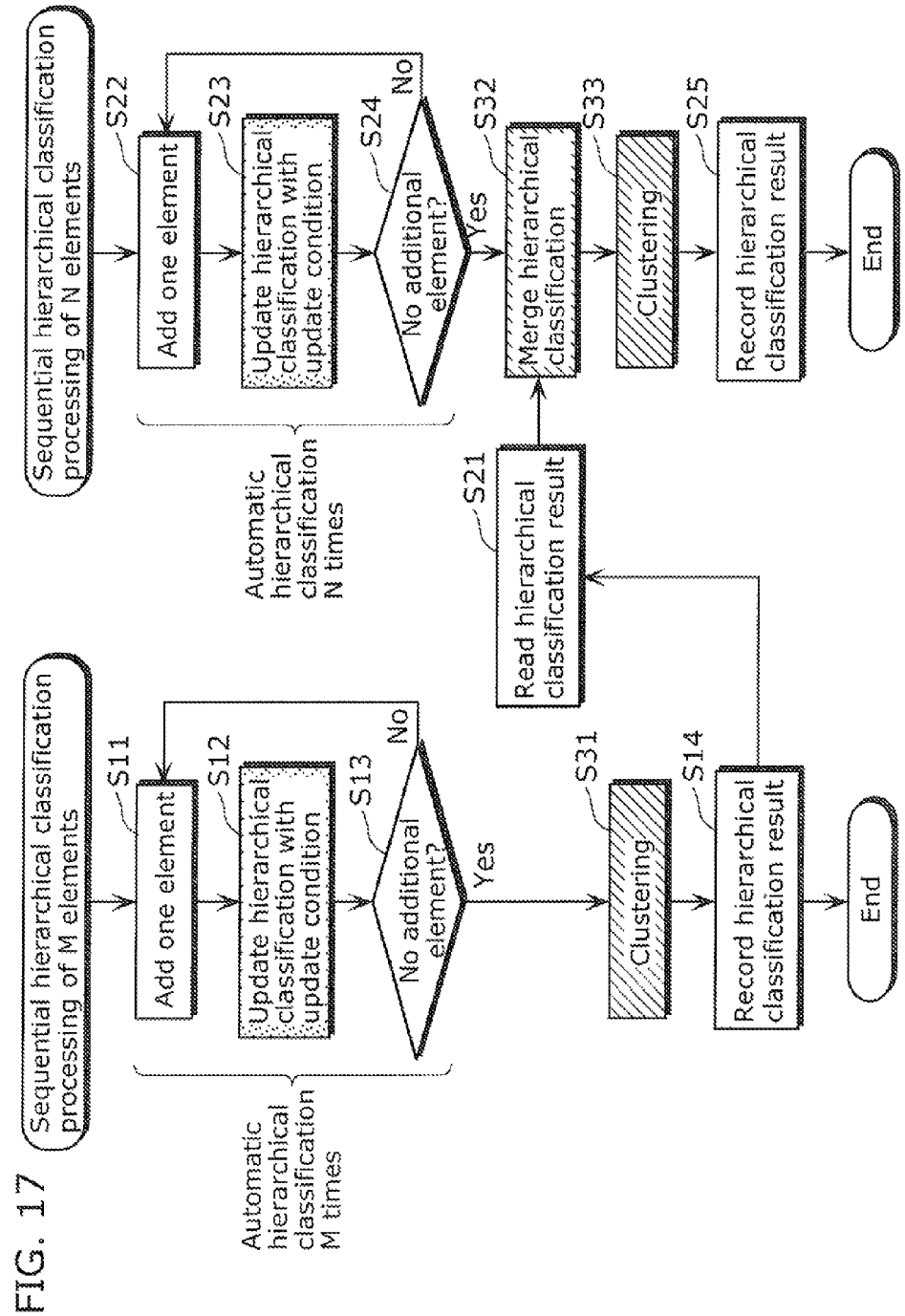
FIG. 17 is a flowchart of processing of the data processing apparatus in Embodiment 4 of the present invention.
Figure 18:
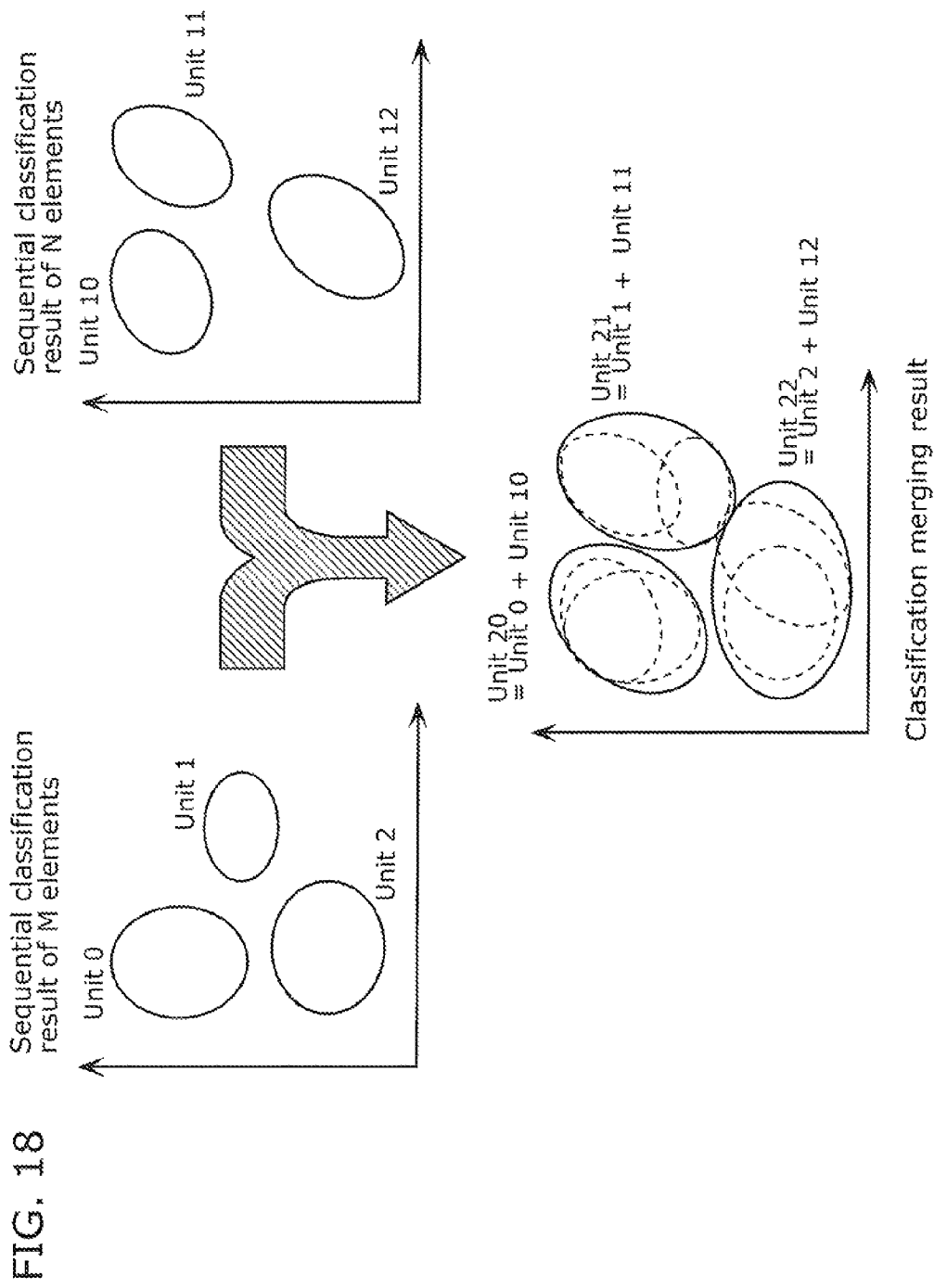
FIG. 18 is a schematic diagram of processing of a hierarchical classification merging unit in the data processing apparatus in Embodiment 4 of the present invention.
Figure 19:
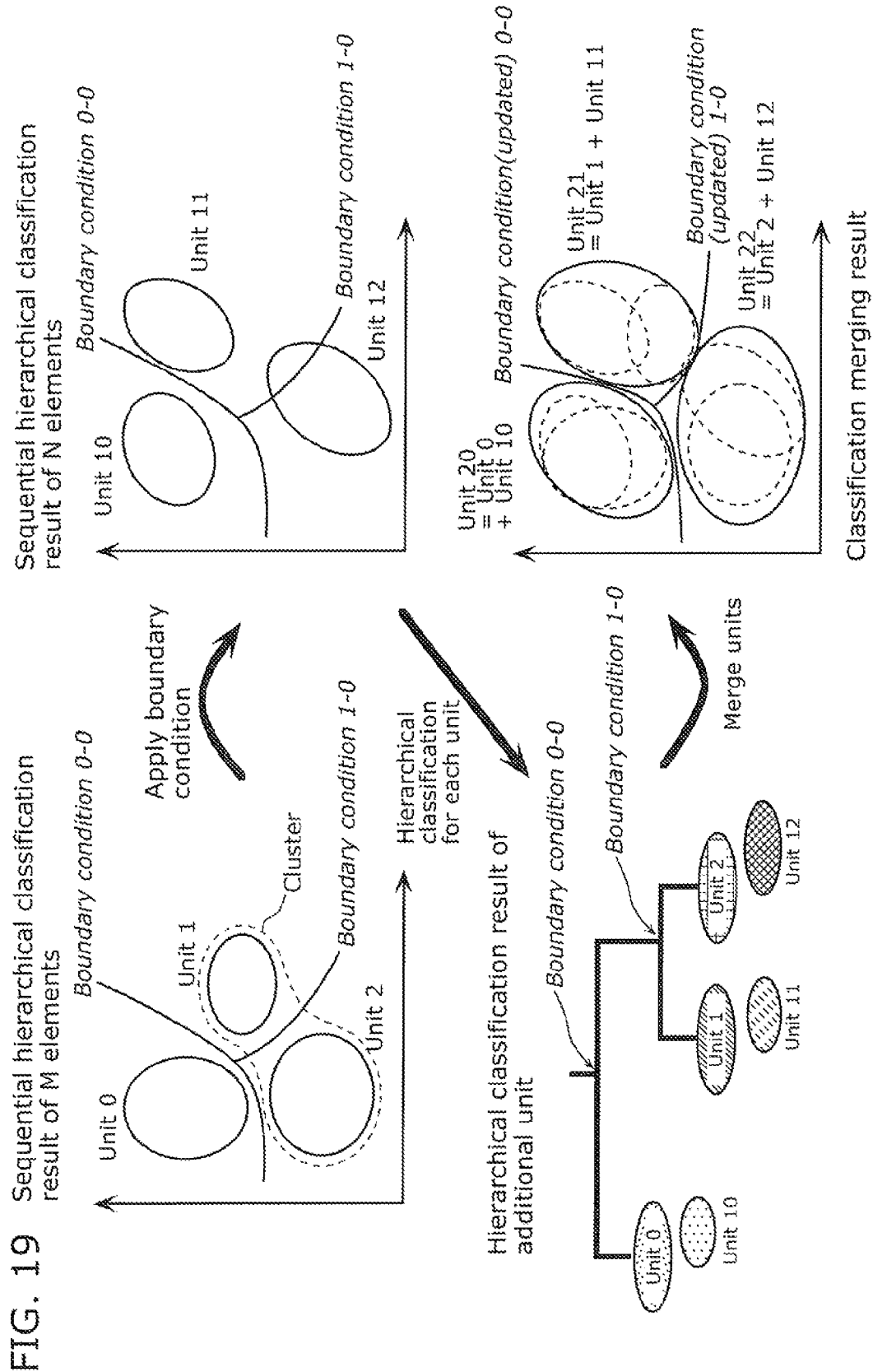
FIG. 19 is a schematic diagram of the processing of the hierarchical classification merging unit in the data processing apparatus in Embodiment 4 of the present invention.

The following describes detailed processing of the belonging unit determination unit 17, the unit-element ID management unit 18, the hierarchical classification boundary condition updating unit 22, and the hierarchical classification merging unit 23, with reference to FIGS. 17 to 19. FIG. 17 is a flowchart of the data processing apparatuses 400 and 500 in Embodiment 4 shown in FIGS. 14 and 16, upon data addition. When compared with FIG. 12, the differences lie in that closed hierarchical automatic classification is performed for each added element data set (Steps S11 to S13, S22 to S24) and hierarchical classification results are merged after automatic classification processing (Step S32), and that clustering processing is performed after automatic classification processing and classification result merging (Steps S31, S33).

FIG. 18 is a schematic diagram showing merging of classification results. As shown in FIG. 18, first classification processing of M pieces of element data (first element data set) and next classification processing of N pieces of element data (second element data set) are executed independently. After this, the results of the two independently executed classification processing are compared with each other. When a distance between units is smaller than an arbitrary distance, the units are merged. A method of computing such an inter-unit distance may be any method, such as a nearest neighbor method, a furthest neighbor method, a group average method, a weighted average method, a centroid method, a weighted centroid method, and a Ward method.

For example, in the case of unit 10 formed by newly added element data in FIG. 18, a distance between units 10 and 0, a distance between units 10 and 1, and a distance between units 10 and 2 are each computed to determine a closest unit. This is repeated for units 11 and 12. Since all inter-unit distances need to be computed in this method, high computation costs are required.

FIG. 19 shows a specific classification merging method when employing the concept of hierarchical classification. The top left diagram in FIG. 19 shows a state where the M pieces of element data are classified into three units 0, 1, and 2 by automatic classification, and further a cluster including units 1 and 2 is generated by clustering. At this point, boundary condition 0-0 that defines a boundary between unit 0 and the cluster and boundary condition 1-0 that defines a boundary between units 1 and 2 are determined. As shown in the bottom left diagram in FIG. 19, boundary condition 0-0 is a classification boundary condition of a highest hierarchical level, and shows the boundary between unit 0 and units 1 and 2 (that is, the cluster). Meanwhile, boundary condition 1-0 is a classification boundary condition of a lower hierarchical level, and shows the boundary between units 1 and 2.

Next, the N pieces of additional elements are inputted and automatically classified. As a result, units 10, 11, and 12 designated by circles in the top right diagram in FIG. 19 are obtained. Each of units 10, 11, and 12 added in this way is compared with the past hierarchical classification boundary conditions, thereby determining which of units 0, 1, and 2 the unit is to be merged with.

For example, in the case of higher nodes in FIG. 19, a distance between unit 10 and units 1 and 2 (that is, the cluster) and a distance between units 10 and 0 are computed by the distance computation method, and then determination shifts to a lower hierarchical level of a closer node. In this case, unit 0 is soon detected as the closer node, and so unit 10 is determined to be merged with unit 0. Thus, after performing unit classification for all additional data, units are merged and classification boundary conditions of each hierarchical level are updated.

According to this method, it is necessary to update only the classification boundary condition of the hierarchical level relating to the merged unit. This contributes to lower computation costs for search and update of merge targets, when compared with the case of computing distances with all units as shown in FIG. 18.

FIG. 20 shows performance when face classification is performed using the data classification method in Embodiment 4. As in FIG. 13 described earlier, a face classification algorithm that uses the same hierarchical classification technique (distance computation method) and face feature value extraction method is implemented in all three methods shown in FIG. 20. The same two photograph data sets (two family photograph sets each of which includes 300 face images) as in FIG. 13 are used as evaluation data. The result of Embodiment 4 is added to the top row in the table.

As is clear from FIG. 20, the constraints (update conditions) of classification are set in Embodiment 4. The definition of the accuracy rate is as explained with regard to the conventional example. Thus, Embodiment 4 achieves approximately the same level of performance as the batch processing method without the update conditions in the case of classifying all face images in one operation, and exhibits a performance improvement of about 4% to 5% as compared with the sequential processing method with the update conditions.

Figure 21B:
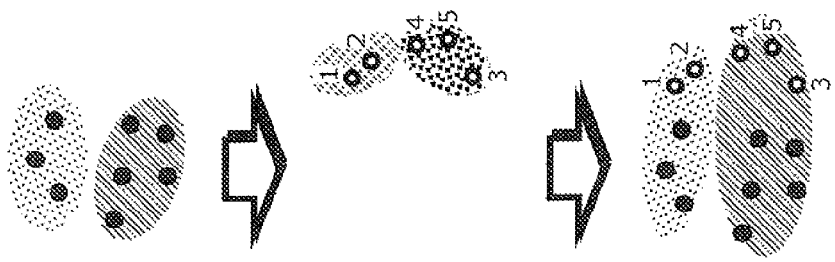
FIG. 21B is a schematic diagram showing a process of growth of a unit generated according to a constrained merging method.
Figure 21A:
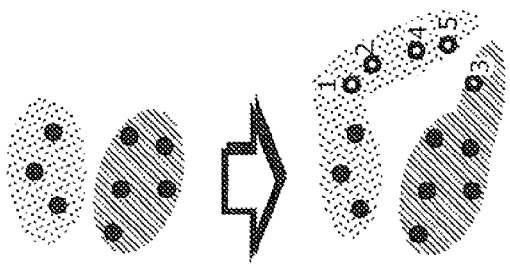
FIG. 21A is a schematic diagram showing a process of growth of a unit generated according to a constrained sequential updating method.
Figure 22:
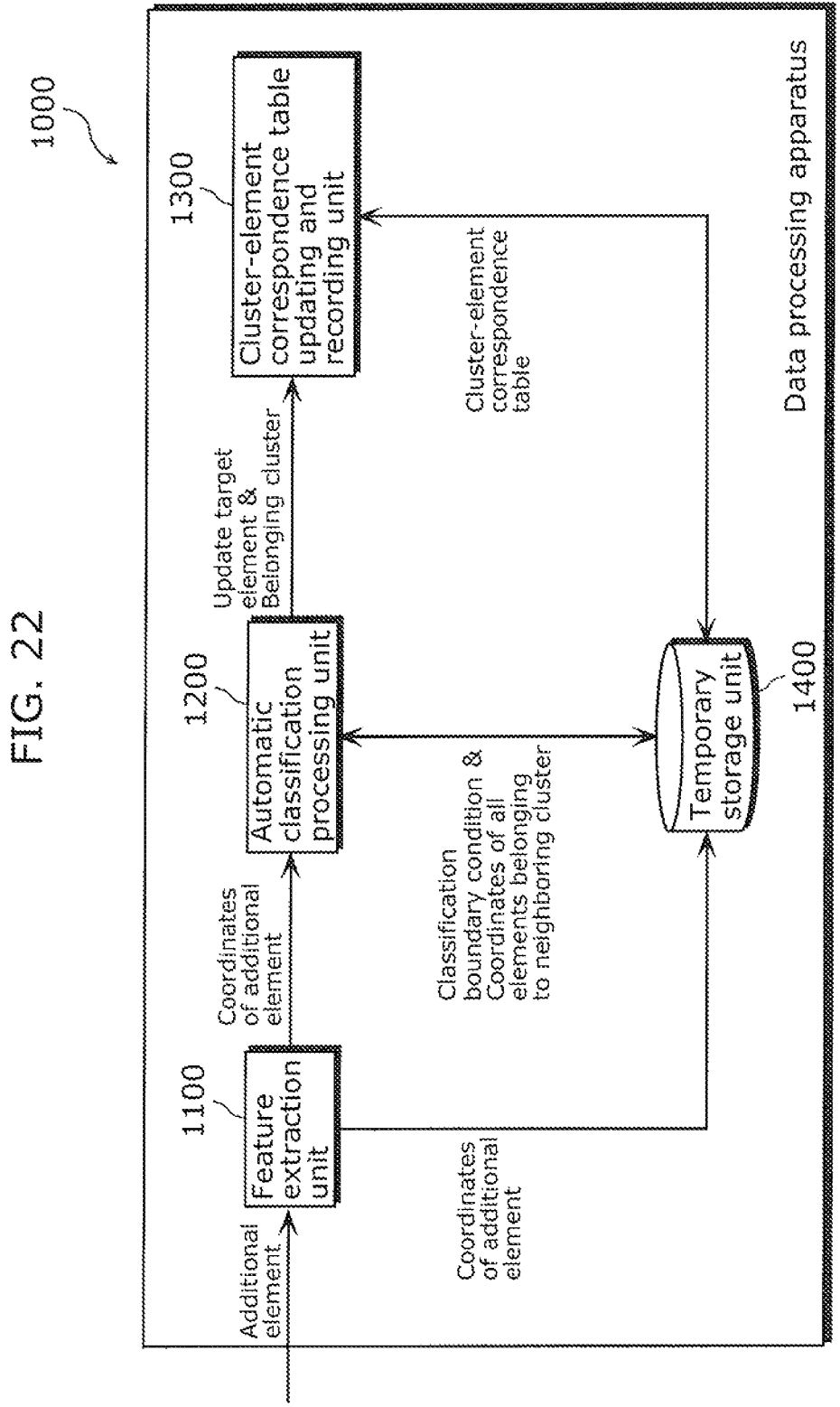
FIG. 22 is a block diagram of a conventional data processing apparatus in sequential automatic classification.
Figure 25:
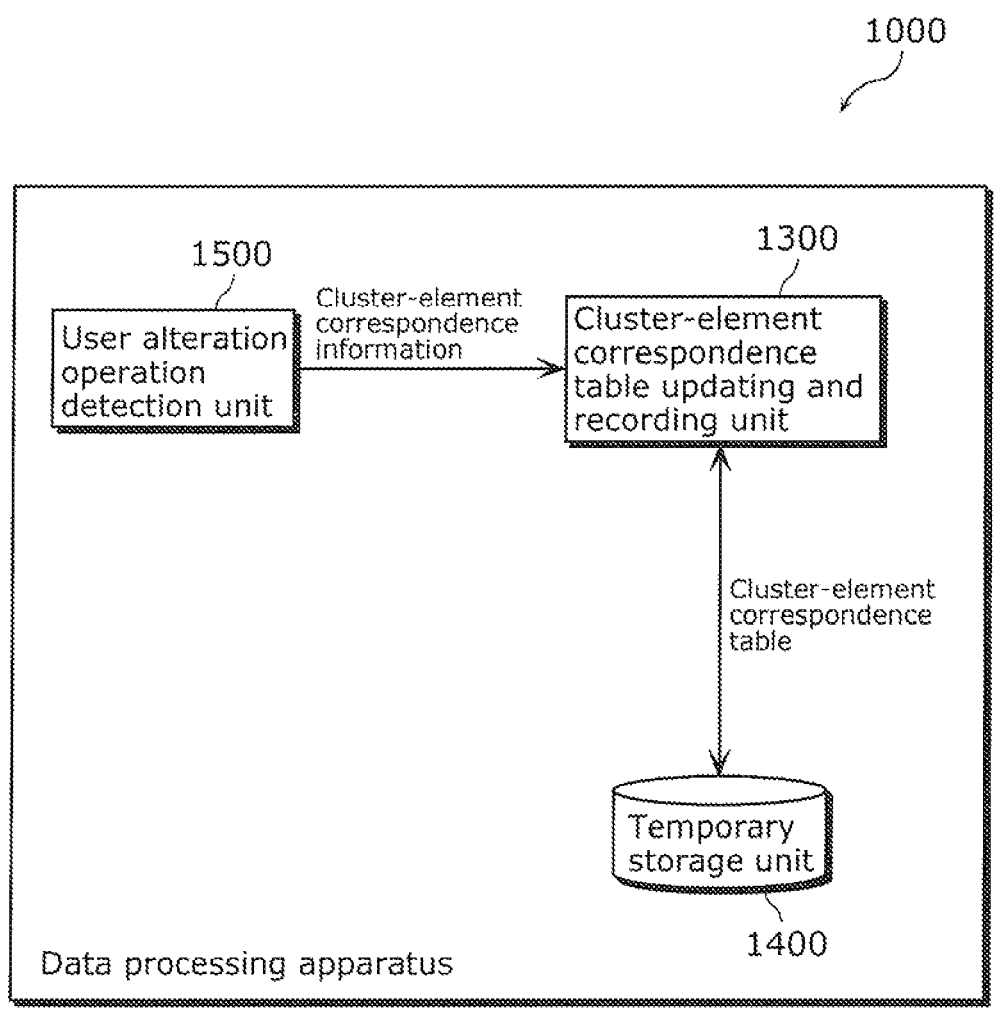
FIG. 25 is a block diagram of the conventional data processing apparatus in annotation result reflection.

FIGS. 21A and 21B show examination as to why the performance is recovered in Embodiment 4. In the constrained sequential updating method shown in FIG. 21A (the middle row in FIG. 20), there is a high possibility that a unit grows into an awkward shape, depending on element data addition order. In the constrained merging method shown in FIG. 21B (Embodiment 4), on the other hand, newly added data is merged in units, so that the possibility of being merged into an awkward shape is low.

Awkward unit shapes cause a state where intricate units exist on the feature space. In such a case, the classification accuracy usually decreases. This is a drawback of typical sequential updating methods. In Embodiment 4, however, such a drawback of sequential updating methods can be alleviated.

In the data processing apparatus and the data processing method according to the present invention, data management and updating are performed separately on automatic classification results and results of manual correction (annotation) of the automatic classification results. This makes it possible to maintain both sequential automatic classification results and annotation information. Moreover, the load of data management processing can be reduced. In such a data management method, by performing closed classification processing independently for each added data set and merging classification results after the classification processing, classification performance that does not degrade even in the case of sequential input can be attained without any contradiction between annotation results and automatic classification results.

Other Variations

Although the present invention has been described by way of the above embodiments, the present invention is not limited to the above embodiments. For example, the present invention also includes the following variations.

Each of the above apparatuses is actually a computer system that includes a microprocessor, a ROM, a RAM, a hard disk unit, a display unit, a keyboard, a mouse, and the like. A computer program is stored on the RAM or the hard disk unit. Functions of each of the apparatuses can be achieved by the microprocessor operating in accordance with the computer program. The computer program mentioned here is a combination of a plurality of instruction codes that represent instructions to a computer for achieving predetermined is functions.

The components that constitute each of the above apparatuses may be partly or wholly realized by one system LSI (Large Scale Integration). The system LSI is an ultra-multifunctional LSI produced by integrating a plurality of components on one chip, and is actually a computer system that includes a microprocessor, a ROM, a RAM, and the like. A computer program is stored on the RAM. Functions of the system LSI can be achieved by the microprocessor operating in accordance with the computer program.

The components that constitute each of the above apparatuses may be partly or wholly realized by an IC card or a single module that is removably connectable to the apparatus. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

The present invention may also be the method described above. The present invention may also be a computer program that realizes the method by a computer. The present invention may also be a digital signal formed by the computer program.

The present invention may also be a computer-readable recording medium, such as a flexible disk, a hard disk, a CD-ROM, an MO, a DVD, a DVD-ROM, a DVD-RAM, a Blu-ray Disc (BD), or a semiconductor memory, on which the computer program or the digital signal is recorded. Conversely, the present invention may be the digital signal recorded on such a recording medium.

The present invention may also be the computer program or the digital signal transmitted via a network such as an electric communication line, a wired or wireless communication line, or the Internet, data broadcasting, and the like.

The present invention may also be a computer system that includes a microprocessor and a memory. In this case, the computer program can be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

The above embodiments may be freely combined.

Though the embodiments of the present invention have been described with reference to the drawings, the present invention is not limited to the illustrated embodiments. Various modifications and changes can be made to the illustrated embodiments within the same or equivalent scope of the present invention.

INDUSTRIAL APPLICABILITY

The structures according to the present invention are useful in various fields such as a consumer photograph organization apparatus and search apparatus, a research database construction apparatus, and so on, where a large amount of data are automatically classified and also classification accuracy is ensured by annotation manually performed by the user.

REFERENCE SIGNS LIST 1, 1100 Feature extraction unit
2, 1200 Automatic classification processing unit
3, 1300 Cluster-element correspondence table updating and recording unit
4 Group-cluster correspondence table addition unit
5, 1400 Temporary storage unit
6 Data management unit
7, 1210 Belonging cluster determination unit
8, 1250 Cluster-element ID management unit
9, 1240 Classification boundary condition reading unit
10, 1230 Classification boundary condition updating and recording unit
11, 1500 User alteration operation detection unit
12 Group-cluster correspondence table updating and recording unit
13 Display group determination unit
14 Group-cluster relation search unit
15, 1700 Cluster-element relation search unit
16, 1800 Display unit
17 Belonging unit determination unit
18 Unit-element ID management unit
19 Classification boundary condition updating unit
20 Classification merging unit
21 Clustering unit
22 Hierarchical classification boundary condition updating unit
23 Hierarchical classification merging unit
24 Hierarchical classification processing unit
1201 Hierarchical classification unit
1220 Neighboring cluster reclassification unit
1260 Hierarchical classification boundary condition updating and recording unit
1600 Display cluster determination unit
100, 200, 300, 400, 500, 1000, 2000 Data processing apparatus

The invention claimed is:

1. A data processing apparatus that executes a sequential automatic classification each time element data is added, and also enables a user to manually perform a reclassification at any time according to the user's subjective criterion, said data processing apparatus comprising:
  a temporary storage unit configured to store therein element data, a cluster-element correspondence table, classification boundary conditions, and a group-cluster correspondence table, the cluster-element correspondence table establishing correspondence between a cluster ID for identifying each of a plurality of clusters classified by said data processing apparatus and an element ID for identifying element data that belongs to a cluster identified by the corresponding cluster ID, the classification boundary conditions each defining a boundary of a different one of the plurality of clusters, and the group-cluster correspondence table establishing a correspondence between a group ID for identifying a group classified according to the user's subjective criterion and the cluster ID for identifying a cluster of the plurality of clusters that belongs to the group identified by the corresponding group ID;
  a feature extraction unit configured to extract a feature value of newly added element data;
  an automatic classification processing unit configured to determine, by comparing the feature value extracted by said feature extraction unit with the classification boundary conditions, a belonging cluster to which the newly added element data belongs from among the plurality of clusters, and to update, according to a predetermined constraint, a classification boundary condition defining a boundary of the belonging cluster so that the newly added element data is included in the belonging cluster;
  a data management unit configured to record an element ID for identifying the newly added element data and a cluster ID for identifying the belonging cluster determined by said automatic classification processing unit, in the cluster-element correspondence table in correspondence with each other; and
  a user alteration operation detection unit configured to detect an operation of altering a correspondence relation between a group ID and an element ID by the user,
  wherein said data management unit is configured to update at least the group-cluster correspondence table, based on a result of the detection by said user alteration operation detection unit.

2. The data processing apparatus according to claim 1, wherein the predetermined constraint is a condition that prohibits merging existing clusters with each other to generate a new cluster during the sequential automatic classification, so as to maintain consistency between a result of the sequential automatic classification and a result of the manual reclassification by the user.

3. The data processing apparatus according to claim 1, wherein the predetermined constraint is a condition that prohibits splitting a part of an existing cluster to generate a new cluster during the sequential automatic classification, so as to maintain consistency between a result of the sequential automatic classification and a result of the manual reclassification by the user.

4. The data processing apparatus according to claim 1, wherein said automatic classification processing unit includes:
  a classification boundary condition reading unit configured to read a classification boundary condition, of the classification boundary conditions, of each of the clusters from said temporary storage unit;
  a belonging cluster determination unit configured to determine the belonging cluster to which the newly added element data belongs, by comparing the feature value extracted by said feature extraction unit with the classification boundary condition of each of the clusters read by said classification boundary condition reading unit;
  a cluster-element ID management unit configured to cause said data management unit to update the cluster-element correspondence table, based on a result of the determination by said belonging cluster determination unit; and a classification boundary condition updating and recording unit configured to update, based on the result of the determination by said belonging cluster determination unit, the classification boundary condition defining the boundary of the belonging cluster according to the predetermined constraint, and to record the updated classification boundary condition in said temporary storage unit.

5. The data processing apparatus according to claim 1, wherein said data management unit includes:
   a first cluster-element correspondence table updating and recording unit configured to: in a case where said automatic classification processing unit determines that the newly added element data belongs to an existing cluster, add the element ID of the newly added element data and a cluster ID of the existing cluster to the cluster-element correspondence table in correspondence with each other; and in a case where said automatic classification processing unit determines that the newly added element data does not belong to any existing cluster, add the element ID of the newly added element data and a newly numbered cluster ID to the cluster-element correspondence table in correspondence with each other; and
   a group-cluster correspondence table addition unit configured to, in the case where said automatic classification processing unit determines that the newly added element data does not belong to any existing cluster, add the newly numbered cluster ID and a newly numbered group ID to the group-cluster correspondence table in correspondence with each other.

6. The data processing apparatus according to claim 1, wherein said data management unit includes:
   a group-cluster correspondence table updating and recording unit configured to extract, from the cluster-element correspondence table, a cluster ID corresponding to the element ID for which the operation of the altering of the correspondence relation is detected by said user alteration operation detection unit, and to update a correspondence relation between the extracted cluster ID and the group ID for which the operation of the altering of the correspondence relation is detected by said user alteration operation detection unit in the group-cluster correspondence table; and
   a cluster-element correspondence table updating and recording unit configured to, only in a case where a correspondence relation between the cluster ID and the element ID needs to be changed as a result of the altering of the correspondence relation between the group ID and the element ID detected by said user alteration operation detection unit, update the correspondence relation between the cluster ID and the element ID in the cluster-element correspondence table.

7. The data processing apparatus according to claim 1, comprising:
   a display group determination unit configured to generate display group information including at least one group ID;
   a group-cluster relation search unit configured to extract, from the group-cluster correspondence table, a cluster ID corresponding to the group ID included in the display group information, and to generate display cluster information including the extracted cluster ID;
   a cluster-element relation search unit configured to extract, from the cluster-element correspondence table, an element ID corresponding to the cluster ID included in the display cluster information, and to generate display element information including the extracted element ID; and
   a display unit configured to read element data identified by the element ID included in the display element information from said temporary storage unit, and to display the read element data.

8. The data processing apparatus according to claim 1, wherein, in a case where a first element data set and a second element data set each of which includes two or more pieces of element data are inputted to said data processing apparatus, said automatic classification processing unit is configured to execute processing of determining the belonging cluster and updating the classification boundary condition, on each of the first element data set and the second element data set independently, and
wherein said data processing apparatus further comprises a classification merging unit configured to merge classification boundary conditions updated in the processing of the first element data set and classification boundary conditions updated in the processing of the second element data set, after the processing is completed for all pieces of element data.

9. The data processing apparatus according to claim 1, wherein said data processing apparatus further comprises:
   a group-cluster correspondence table updating and recording unit; and
   a cluster-element correspondence table updating and recording unit;
   wherein said user alteration operation detection unit is configured to:
      upon detecting that the user starts an annotation operation, notify said group-cluster correspondence table updating and recording unit and said cluster-element correspondence table updating and recording unit of the annotation operation;
      send contents of an actual alteration to said group-cluster correspondence table updating and recording unit, as group-cluster element correspondence information;
      allow the user to perform an operation of altering correspondence relations between group IDs and element IDs; and
      send results of the operation of altering the correspondence relations performed by the user, to said group-cluster correspondence table updating and recording unit as the group-cluster-element correspondence information.

10. A data processing apparatus that executes a sequential automatic classification each time element data is added, and also enables a user to manually perform reclassification at any time according to the user's subjective criterion, said data processing apparatus comprising:
   a temporary storage unit configured to store therein element data, a cluster-element correspondence table, classification boundary conditions, and a group-cluster correspondence table, the cluster-element correspondence table establishing correspondence between a cluster ID for identifying each of a plurality of clusters classified by said data processing apparatus and an element ID for identifying element data that belongs to a cluster identified by the corresponding cluster ID, the classification boundary conditions each defining a boundary of a different one of the plurality of clusters, and the group-cluster correspondence table establishing a correspondence between a group ID for identifying a group classified according to the user's subjective criterion and the cluster ID for identifying a cluster of the plurality of clusters that belongs to the group identified by the corresponding group ID;
- a user alteration operation detection unit configured to detect an operation of altering a correspondence relation between a group ID and an element ID by the user; and
- a data management unit configured to update at least the group-cluster correspondence table, based on a result of the detection by said user alteration operation detection unit.

11. A data processing apparatus that executes a sequential automatic classification each time element data is added, and also enables a user to manually perform a reclassification at any time according to the user's subjective criterion, said data processing apparatus comprising:
- a temporary storage unit configured to store therein element data, a unit-element correspondence table, and classification boundary conditions, the unit-element correspondence table establishing correspondence between a unit ID for identifying each of a plurality of units classified by said data processing apparatus and an element ID for identifying element data that belongs to a unit identified by the corresponding unit ID, and the classification boundary conditions each defining a boundary of a different one of the plurality of units;
- a feature extraction unit configured to extract a feature value of newly added element data;
- a hierarchical classification processing unit configured to determine, by comparing the feature value extracted by said feature extraction unit with the classification boundary conditions, a belonging unit to which the newly added element data belongs from among the plurality of units, and to update, according to a predetermined constraint, a classification boundary condition defining a boundary of the belonging unit so that the newly added element data is included in the belonging unit; and
- a data management unit configured to record an element ID for identifying the newly added element data and a unit ID for identifying the belonging unit determined by said hierarchical classification processing unit, in the unit-element correspondence table in correspondence with each other,
- wherein, in a case where a first element data set and a second element data set each of which includes two or more pieces of element data are inputted to said data processing apparatus, said hierarchical classification processing unit is configured to execute processing of determining the belonging unit and updating the classification boundary condition, on each of the first element data set and the second element data set independently,
- wherein said data processing apparatus further comprises a hierarchical classification merging unit configured to merge classification boundary conditions updated in the processing of the first element data set and classification boundary conditions updated in the processing of the second element data set,
- wherein said data processing apparatus further comprises a user alteration operation detection unit configured to detect an operation of altering a correspondence relation between a group ID and an element ID by the user, and
- wherein said data management unit is configured to update at least a group-unit correspondence table, based on a result of the detection by said user alteration operation detection unit.

12. The data processing apparatus according to claim 11, further comprising a clustering unit configured to generate a cluster that includes a plurality of units, and to determine a classification boundary condition defining a boundary of the cluster,
- wherein said hierarchical classification processing unit is configured to determine a belonging cluster to which the newly added element data belongs by comparing the feature value with the classification boundary condition of the cluster, and further determine the belonging unit by comparing the feature value with a classification boundary condition of each of the plurality of units included in the belonging cluster.

13. The data processing apparatus according to claim 11, wherein said hierarchical classification processing unit includes:
- a belonging unit determination unit configured to determine the belonging unit to which the newly added element data belongs, by comparing the feature value extracted by said feature extraction unit with the classification boundary condition of each of the units read from said temporary storage unit;
- a unit-element ID management unit configured to update the unit-element correspondence table, based on a result of the determination by said belonging unit determination unit; and
- a hierarchical classification boundary condition updating and recording unit configured to update, based on the result of the determination by said belonging unit determination unit, the classification boundary condition defining the boundary of the belonging unit according to the predetermined constraint, and to record the updated classification boundary condition in said temporary storage unit.

14. The data processing apparatus according to claim 11, wherein the predetermined constraint is a condition that prohibits merging existing units with each other to generate a new unit or prohibits splitting a part of an existing unit to generate the new unit during the sequential automatic classification, so as to maintain consistency between a result of the sequential automatic classification and a result of the manual reclassification by the user.

15. A data processing method for use in a data processing apparatus for executing a sequential automatic classification each time element data is added and also enabling a user to manually perform a reclassification at any time according to the user's subjective criterion, the data processing apparatus including a temporary storage unit that stores therein element data, a cluster-element correspondence table, classification boundary conditions, and a group-cluster correspondence table, the cluster-element correspondence table establishing a correspondence between a cluster ID for identifying each of a plurality of clusters classified by the data processing apparatus and an element ID for identifying element data that belongs to a cluster identified by the corresponding cluster ID, the classification boundary conditions each defining a boundary of a different one of the plurality of clusters, and the group-cluster correspondence showing establishing correspondence between a group ID for identifying a group classified according to the user's subjective criterion and the cluster ID for identifying a cluster of the plurality of clusters that belongs to the group identified by the corresponding group ID, said data processing method comprising:
- extracting a feature value of newly added element data;
- determining, by comparing the feature value extracted in said extracting with the classification boundary conditions, a belonging cluster to which the newly added element data belongs from among the plurality of clusters;

updating, according to a predetermined constraint, a classification boundary condition defining a boundary of the belonging cluster so that the newly added element data is included in the belonging cluster;

recording an element ID for identifying the newly added element data and a cluster ID for identifying the belonging cluster determined in said determining, in the cluster-element correspondence table in correspondence with each other;

detecting an operation of altering a correspondence relation between a group ID and an element ID by the user; and updating at least the group-cluster correspondence table, based on a result of said detecting of the operation of the altering of the correspondence relation.

16. A data processing method for use in a data processing apparatus for executing a sequential automatic classification each time element data is added and also enabling a user to manually perform a reclassification at any time according to the user's subjective criterion, the data processing apparatus including a temporary storage unit that stores therein element data, a unit-element correspondence table, and classification boundary conditions, the unit-element correspondence table establishing correspondence between a unit ID for identifying each of a plurality of units classified by the data processing apparatus and an element ID for identifying element data that belongs to a unit identified by the corresponding unit ID, and the classification boundary conditions each defining a boundary of a different one of the plurality of units, said data processing method comprising:

extracting a feature value of newly added element data;

determining, by comparing the feature value extracted in said extracting with the classification boundary conditions, a belonging unit to which the newly added element data belongs from among the plurality of units;

updating, according to a predetermined constraint, a classification boundary condition defining a boundary of the belonging unit so that the newly added element data is included in the belonging unit; and recording an element ID for identifying the newly added element data and a unit ID for identifying the belonging unit determined in said determining, in the unit-element correspondence table in correspondence with each other, wherein, in a case where a first element data set and a second element data set each of which includes two or more pieces of element data are inputted to the data processing apparatus, said determining includes executing processing of determining the belonging unit and updating the classification boundary condition, on each of the first element data set and the second element data set independently, wherein said data processing method further comprises merging classification boundary conditions updated in the processing of the first element data set and classification boundary conditions updated in the processing of the second element data set, wherein said data processing method further comprises detecting an operation of altering a correspondence relation between a group ID and an element ID by the user, and wherein said data processing method further comprises updating at least a group-unit correspondence table, based on a result of said detecting of the operation of the altering of the correspondence relation.

17. A non-transitory computer-readable recording medium for use in a data processing apparatus, said recording medium having a computer program recorded thereon for causing the data processing apparatus to execute a process of executing a sequential automatic classification each time element data is added and also enabling a user to manually perform a reclassification at any time according to the user's subjective criterion, the data processing apparatus including a temporary storage unit that stores therein element data, a cluster-element correspondence table, classification boundary conditions, and a group-cluster correspondence table, the cluster-element correspondence table establishing a correspondence between a cluster ID for identifying each of a plurality of clusters classified by the data processing apparatus and an element ID for identifying element data that belongs to a cluster identified by the corresponding cluster ID, the classification boundary conditions each defining a boundary of a different one of the plurality of clusters, and the group-cluster correspondence table establishing correspondence between a group ID for identifying a group classified according to the user's subjective criterion and the cluster ID for identifying a cluster of the plurality of clusters that belongs to the group identified by the corresponding group ID, and the computer program causing the data processing apparatus to execute, as a computer, a method comprising:

extracting a feature value of newly added element data;

determining, by comparing the feature value extracted in said extracting with the classification boundary conditions, a belonging cluster to which the newly added element data belongs from among the plurality of clusters;

updating, according to a predetermined constraint, a classification boundary condition defining a boundary of the belonging cluster so that the newly added element data is included in the belonging cluster;

recording an element ID for identifying the newly added element data and a cluster ID for identifying the belonging cluster determined in said determining, in the cluster-element correspondence table in correspondence with each other;

detecting an operation of altering a correspondence relation between a group ID and an element ID by the user; and updating at least the group-cluster correspondence table, based on a result of said detecting of the operation of the altering of the correspondence relation.

18. A non-transitory computer-readable recording medium for use in a data processing apparatus, said recording medium having a computer program recorded thereon for causing the data processing apparatus to execute a process of executing a sequential automatic classification each time element data is added and also enabling a user to manually perform a reclassification at any time according to the user's subjective criterion, the data processing apparatus including a temporary storage unit that stores therein element data, a unit-element correspondence table, and classification boundary conditions, the unit-element correspondence table establishing correspondence between a unit ID for identifying each of a plurality of units classified by the data processing apparatus and an element ID for identifying element data that belongs to a unit identified by the corresponding unit ID, and the classification boundary conditions each defining a boundary of a different one of the plurality of units, the computer program causing the data processing apparatus to execute, as a computer, a method comprising:

extracting a feature value of newly added element data;

determining, by comparing the feature value extracted in said extracting with the classification boundary conditions, a belonging unit to which the newly added element data belongs from among the plurality of units;

updating, according to a predetermined constraint, a classification boundary condition defining a boundary of the belonging unit so that the newly added element data is included in the belonging unit; and recording an element ID for identifying the newly added element data and a unit ID for identifying the belonging unit determined in said determining, in the unit-element correspondence table in correspondence with each other, wherein, in a case where a first element data set and a second element data set each of which includes two or more pieces of element data are inputted to the data processing apparatus, said determining includes executing processing of determining the belonging unit and updating the classification boundary condition, on each of the first element data set and the second element data set independently, wherein the method further comprises merging classification boundary conditions updated in the processing of the first element data set and classification boundary conditions updated in the processing of the second element data set, wherein the method further comprises detecting an operation of altering a correspondence relation between a group ID and an element ID by the user, and wherein the method further comprises updating at least a group-unit correspondence table, based on a result of said detecting of the operation of the altering of the correspondence relation.

19. An integrated circuit provided in a data processing apparatus including a temporary storage unit that stores therein element data, a cluster-element correspondence table, classification boundary conditions, and a group-cluster correspondence table, the cluster-element correspondence table establishing correspondence between a cluster ID for identifying each of a plurality of clusters classified by the data processing apparatus and an element ID for identifying element data that belongs to a cluster identified by the corresponding cluster ID, the classification boundary conditions each defining a boundary of a different one of the plurality of clusters, and the group-cluster correspondence table establishing a correspondence between a group ID for identifying a group classified according to a user's subjective criterion and the cluster ID for identifying a cluster of the plurality of clusters that belongs to the group identified by the corresponding group ID, said integrated circuit comprising:

a feature extraction unit configured to extract a feature value of newly added element data;

an automatic classification processing unit configured to determine, by comparing the feature value extracted by said feature extraction unit with the classification boundary conditions, a belonging cluster to which the newly added element data belongs from among the plurality of clusters, and to update, according to a predetermined constraint, a classification boundary condition defining a boundary of the belonging cluster so that the newly added element data is included in the belonging cluster;

a data management unit configured to record an element ID for identifying the newly added element data and a cluster ID for identifying the belonging cluster determined by said automatic classification processing unit, in the cluster-element correspondence table in correspondence with each other; and a user alteration operation detection unit configured to detect an operation of altering a correspondence relation between a group ID and an element ID by the user, wherein said data management unit is configured to update at least the group-cluster correspondence table, based on a result of the detection by said user alteration operation detection unit.

20. An integrated circuit provided in a data processing apparatus including a temporary storage unit that stores therein element data, a unit-element correspondence table, and classification boundary conditions, the unit-element correspondence table establishing correspondence between a unit ID for identifying each of a plurality of units classified by the data processing apparatus and an element ID for identifying element data that belongs to a unit identified by the corresponding unit ID, and the classification boundary conditions each defining a boundary of a different one of the plurality of units, said integrated circuit comprising:

a feature extraction unit configured to extract a feature value of newly added element data;

a hierarchical classification processing unit configured to determine, by comparing the feature value extracted by said feature extraction unit with the classification boundary conditions, a belonging unit to which the newly added element data belongs from among the plurality of units, and to update, according to a predetermined constraint, a classification boundary condition defining a boundary of the belonging unit so that the newly added element data is included in the belonging unit; and a data management unit configured to record an element ID for identifying the newly added element data and a unit ID for identifying the belonging unit determined by said hierarchical classification processing unit, in the unit-element correspondence table in correspondence with each other, wherein, in a case where a first element data set and a second element data set each of which includes two or more pieces of element data are inputted to the data processing apparatus, said hierarchical classification processing unit is configured to execute processing of determining the belonging unit and updating the classification boundary condition, on each of the first element data set and the second element data set independently, wherein said integrated circuit further comprises a hierarchical classification merging unit configured to merge classification boundary conditions updated in the processing of the first element data set and classification boundary conditions updated in the processing of the second element data set, wherein said integrated circuit further comprises a user alteration operation detection unit configured to detect an operation of altering a correspondence relation between a group ID and an element ID by the user, and wherein said integrated circuit unit is configured to update at least a group-unit correspondence table, based on a result of the detection by said user alteration operation detection unit.

* * * * *